US012670334B2

(12) United States Patent
Buchanan et al.

(10) Patent No.: US 12,670,334 B2
(45) Date of Patent: Jun. 30, 2026

(54) CHATBOT WITH DYNAMIC CONVERSATIONAL TONE

(71) Applicant: The Toronto-Dominion Bank, Toronto (CA)

(72) Inventors: Amanda Buchanan, Toronto (CA);
Sophie Na-Hyun Park, Toronto (CA);
John Jong-Suk Lee, Toronto (CA);
Robert Alojz Skaljin, Hamilton (CA);
Jillian Margaret Pigot Rivard, Ottawa (CA); Steven Anthony Ghose,
Burlington (CA); Seonaid Marlaine Eggett, Toronto (CA); John Anthony Caligaris, III, Ballston Spa, NY (US);
Kaycee Lee MacQueen, London (CA);
Vinodhini Pandurangan, Chester Springs, PA (US); Hilary Wing-Mun Chan, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 31 days.

(21) Appl. No.: 18/614,788

(22) Filed: Mar. 25, 2024

(65) Prior Publication Data

US 2025/0298987 A1     Sep. 25, 2025

(51) Int. Cl.
*G06F 40/35* (2020.01)
*H04L 51/02* (2022.01)

(52) U.S. Cl.
CPC .............. *G06F 40/35* (2020.01); *H04L 51/02* (2013.01)

(58) Field of Classification Search
None
See application file for complete search history.

(56) References Cited

U.S. PATENT DOCUMENTS

| | | | |
|---|---|---|---|
| 9,864,982 B2 | 1/2018 | Bristow et al. | |
| 9,875,494 B2 | 1/2018 | Kalns et al. | |

(Continued)

FOREIGN PATENT DOCUMENTS

| | | |
|---|---|---|
| CN | 108000526 A | 5/2018 |
| KR | 20240007888 A | 1/2024 |

(Continued)

OTHER PUBLICATIONS

Heglin et al., "Auto-Adjudication Process via Machine Learning," U.S. Appl. No. 19/053,942, filed Feb. 14, 2025.

(Continued)

*Primary Examiner* — Nafiz E Hoque

(57)                     ABSTRACT
An example operation may include one or more of executing an interaction with an account via a chatbot within a chat element running on an account device, determining a next response for the chatbot to output within the chat element based on an execution of an artificial intelligence (AI) model on content within the chat element, determining an interaction attribute of the next response based on an execution of a second AI model on the content from the chat element and on historical chat content of the account device and the chatbot, and outputting the next response via the chatbot within the chat element based on the determined interaction attribute. The example operation may further include an AI agent that performs an action based on the next response.

18 Claims, 25 Drawing Sheets

700A

User Device

(56) References Cited

U.S. PATENT DOCUMENTS

| | | |
|---|---|---|
| 10,163,085 B2 | 12/2018 | D'Agostino et al. |
| 10,178,246 B1 | 1/2019 | Horvath et al. |
| 10,181,114 B2 | 1/2019 | Tseretopoulos et al. |
| 10,339,931 B2 | 7/2019 | Tseretopoulos et al. |
| 10,346,824 B2 | 7/2019 | Chan et al. |
| 10,360,303 B2 | 7/2019 | Volkovs et al. |
| 10,405,146 B1 | 9/2019 | Kuruvilla et al. |
| 10,438,206 B2 | 10/2019 | Jivraj et al. |
| 10,440,196 B2 | 10/2019 | Horvath et al. |
| 10,440,197 B2 | 10/2019 | Horvath et al. |
| 10,460,748 B2 | 10/2019 | Tseretopoulos et al. |
| 10,482,675 B1 | 11/2019 | Sutter et al. |
| 10,630,840 B1 | 4/2020 | Karp et al. |
| 10,659,400 B2 | 5/2020 | Moon et al. |
| 10,698,902 B2 | 6/2020 | Tseretopoulos et al. |
| 10,706,635 B2 | 7/2020 | Sutter et al. |
| 10,708,721 B2 | 7/2020 | Kuruvilla et al. |
| 10,728,259 B2 | 7/2020 | McCarter et al. |
| 10,776,619 B2 | 9/2020 | Collinson et al. |
| 10,824,941 B2 | 11/2020 | Volkovs et al. |
| 10,831,923 B2 | 11/2020 | Dunjic et al. |
| 10,832,047 B2 | 11/2020 | Moghtadai |
| 10,861,442 B2 | 12/2020 | Manoharan et al. |
| 10,862,897 B2 | 12/2020 | D'Agostino et al. |
| 10,867,292 B2 | 12/2020 | Lin et al. |
| 10,867,293 B2 | 12/2020 | Bristow et al. |
| 10,878,816 B2 | 12/2020 | Tseretopoulos et al. |
| 10,902,220 B2 | 1/2021 | Lozon et al. |
| 10,922,665 B2 | 2/2021 | Miller et al. |
| 10,943,605 B2 | 3/2021 | Tseretopoulos et al. |
| 10,977,617 B2 | 4/2021 | Tseretopoulos et al. |
| 11,004,187 B2 | 5/2021 | Kuruvilla et al. |
| 11,017,028 B2 | 5/2021 | Dunjic et al. |
| 11,030,415 B2 | 6/2021 | Volkovs et al. |
| 11,032,421 B2 | 6/2021 | Karp et al. |
| 11,055,924 B2 | 7/2021 | Navarro et al. |
| 11,061,638 B2 | 7/2021 | Lam |
| 11,070,448 B2 | 7/2021 | Miller et al. |
| 11,087,314 B2 | 8/2021 | Gandhi et al. |
| 11,100,168 B2 | 8/2021 | Miller et al. |
| 11,140,143 B2 | 10/2021 | Moon et al. |
| 11,144,921 B2 | 10/2021 | Dunjic et al. |
| 11,144,998 B2 | 10/2021 | Kuruvilla et al. |
| 11,145,169 B2 | 10/2021 | Pratten et al. |
| 11,176,598 B2 | 11/2021 | D'souza et al. |
| 11,182,860 B2 | 11/2021 | Kuruvilla et al. |
| 11,200,328 B2 | 12/2021 | Shpurov et al. |
| 11,200,411 B2 | 12/2021 | Rizvi et al. |
| 11,210,857 B2 | 12/2021 | Rizvi et al. |
| 11,218,429 B2 | 1/2022 | Yun et al. |
| 11,222,286 B2 | 1/2022 | Choe et al. |
| 11,232,304 B2 | 1/2022 | Navarro et al. |
| 11,276,257 B2 | 3/2022 | Moghtadai et al. |
| 11,303,642 B2 | 4/2022 | Dunjic et al. |
| 11,334,574 B2 | 5/2022 | Caputo et al. |
| 11,347,744 B2 | 5/2022 | Tseretopoulos et al. |
| 11,349,871 B2 | 5/2022 | Moon et al. |
| 11,354,442 B2 | 6/2022 | Haldenby et al. |
| 11,361,566 B2 | 6/2022 | Collinson et al. |
| 11,373,229 B2 | 6/2022 | Tseretopoulos et al. |
| 11,392,776 B2 | 7/2022 | Lozon et al. |
| 11,393,020 B2 | 7/2022 | Mathew et al. |
| 11,394,668 B1 | 7/2022 | Subbunarayanan et al. |
| 11,397,765 B2 | 7/2022 | Volkovs et al. |
| 11,409,811 B2 | 8/2022 | D'Agostino |
| 11,411,734 B2 | 8/2022 | Shpurov et al. |
| 11,430,242 B2 | 8/2022 | Moghtadai |
| 11,436,809 B2 | 9/2022 | Rizvi et al. |
| 11,451,669 B1 | 9/2022 | Navarro et al. |
| 11,469,878 B2 | 10/2022 | Shpurov et al. |
| 11,470,091 B2 | 10/2022 | McCarter et al. |
| 11,470,143 B2 | 10/2022 | Joheb et al. |
| 11,475,059 B2 | 10/2022 | Liu et al. |
| 11,475,251 B2 | 10/2022 | Morin et al. |
| 11,477,265 B2 | 10/2022 | McPhee et al. |
| 11,507,622 B2 | 11/2022 | Grebenisan et al. |
| 11,507,868 B2 | 11/2022 | Kwong et al. |
| 11,546,345 B2 | 1/2023 | D'Agostino et al. |
| 11,580,762 B2 | 2/2023 | Rizvi et al. |
| 11,593,608 B2 | 2/2023 | Kuo et al. |
| 11,600,064 B2 | 3/2023 | Navarro et al. |
| 11,604,899 B2 | 3/2023 | Haldenby et al. |
| 11,620,741 B2 | 4/2023 | Kuruvilla et al. |
| 11,632,311 B2 | 4/2023 | Miller et al. |
| 11,651,100 B2 | 5/2023 | Dunjic et al. |
| 11,663,488 B2 | 5/2023 | Volkovs et al. |
| 11,671,536 B2 | 6/2023 | Navarro et al. |
| 11,687,995 B2 | 6/2023 | Tseretopoulos et al. |
| 11,689,484 B2 | 6/2023 | Moon et al. |
| 11,704,782 B2 | 7/2023 | Wakim et al. |
| 11,741,305 B2 | 8/2023 | Skaljin et al. |
| 11,743,210 B2 | 8/2023 | Moon et al. |
| 11,748,400 B2 | 9/2023 | Volkovs et al. |
| 11,750,741 B2 | 9/2023 | Karp et al. |
| 11,756,388 B2 | 9/2023 | Pratten et al. |
| 11,757,807 B2 | 9/2023 | Bhardwaj et al. |
| 11,777,918 B2 | 10/2023 | Moon et al. |
| 11,782,935 B2 | 10/2023 | Caputo et al. |
| 11,789,909 B2 | 10/2023 | Grebenisan et al. |
| 11,790,012 B2 | 10/2023 | D'Agostino |
| 11,790,354 B2 | 10/2023 | Gandhi et al. |
| 11,797,962 B2 | 10/2023 | Jones et al. |
| 11,809,486 B2 | 11/2023 | Liu et al. |
| 11,809,577 B2 | 11/2023 | Begg et al. |
| 11,811,826 B2 | 11/2023 | Moon et al. |
| 11,842,252 B2 | 12/2023 | Kuang et al. |
| 11,875,398 B2 | 1/2024 | Pratten et al. |
| 11,880,811 B2 | 1/2024 | Pawelkiewicz et al. |
| 11,886,764 B2 | 1/2024 | Lam |
| 11,928,112 B2 | 3/2024 | Dunjic et al. |
| 11,941,525 B2 | 3/2024 | Morin et al. |
| 11,941,703 B2 | 3/2024 | Kuruvilla et al. |
| 11,955,117 B2 | 4/2024 | McDermid et al. |
| 11,966,491 B2 | 4/2024 | D'Agostino |
| 11,978,085 B2 | 5/2024 | Rai et al. |
| 11,978,090 B2 | 5/2024 | Navarro et al. |
| 11,985,153 B2 | 5/2024 | Karl |
| 11,995,121 B2 | 5/2024 | Volkovs et al. |
| 12,008,315 B2 | 6/2024 | Miller et al. |
| 12,014,303 B2 | 6/2024 | Carvalho et al. |
| 12,019,594 B2 | 6/2024 | Floyd et al. |
| 12,021,874 B2 | 6/2024 | Dunjic et al. |
| 12,039,535 B2 | 7/2024 | Dunjic et al. |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 12,164,542 B1 | 12/2024 | Rahman et al. |
| 12,169,693 B2 | 12/2024 | Lu |
| 12,182,800 B2 | 12/2024 | Navarro et al. |
| 12,198,109 B2 | 1/2025 | Abbas |
| 12,198,510 B2 | 1/2025 | Pratten et al. |
| 12,210,534 B2 | 1/2025 | Cashion et al. |
| 12,211,274 B2 | 1/2025 | Ma et al. |
| 12,217,011 B2 | 2/2025 | Luo et al. |
| 12,223,549 B2 | 2/2025 | Bouëtté et al. |
| 12,229,690 B2 | 2/2025 | Stanevich et al. |
| 12,254,512 B2 | 3/2025 | Heglin et al. |
| 12,282,785 B2 | 4/2025 | Karbasi et al. |
| 12,288,236 B2 | 4/2025 | Volkovs et al. |
| 12,299,149 B2 | 5/2025 | Nikoghossian et al. |
| 12,316,715 B2 | 5/2025 | Taheri et al. |
| 12,321,861 B2 | 6/2025 | Volkovs et al. |
| 12,326,856 B2 | 6/2025 | Mohammed et al. |
| 12,333,354 B2 | 6/2025 | Mohammed et al. |
| 12,353,969 B2 | 7/2025 | Kuang et al. |
| 12,354,094 B2 | 7/2025 | Jones et al. |
| 12,373,795 B2 | 7/2025 | Misler et al. |
| 2018/0268818 A1 | 9/2018 | Schoenmackers et al. |

(56) References Cited

U.S. PATENT DOCUMENTS

| 2019/0140986 A1 | 5/2019 | Anderson et al. |
| 2019/0172045 A1 | 6/2019 | Dunjic et al. |
| 2019/0172454 A1* | 6/2019 | Kitajima ............... G06F 3/167 |
| 2020/0007380 A1 | 1/2020 | Chen et al. |
| 2020/0058068 A1 | 2/2020 | Gandhi et al. |
| 2020/0382450 A1 | 12/2020 | Vaughn et al. |
| 2021/0027160 A1 | 1/2021 | Volkovs et al. |
| 2021/0037040 A1 | 2/2021 | Aleks et al. |
| 2021/0049237 A1 | 2/2021 | Demme et al. |
| 2021/0117893 A1 | 4/2021 | Sohum et al. |
| 2021/0203623 A1 | 7/2021 | Zhou et al. |
| 2021/0232950 A1 | 7/2021 | Kono |
| 2021/0264461 A1 | 8/2021 | Fam |
| 2021/0397793 A1* | 12/2021 | Li .......................... G06F 40/166 |
| 2021/0407016 A1 | 12/2021 | Kuruvilla et al. |
| 2022/0058489 A1 | 2/2022 | Volkovs et al. |
| 2022/0108069 A1 | 4/2022 | Lee |
| 2022/0157094 A1 | 5/2022 | Moghtadai et al. |
| 2022/0172083 A1 | 6/2022 | Wu et al. |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300716 A1 | 9/2022 | Sabharwal et al. |
| 2022/0300903 A1 | 9/2022 | Huang et al. |
| 2022/0309250 A1 | 9/2022 | Das et al. |
| 2022/0309573 A1 | 9/2022 | Mathew et al. |
| 2022/0318573 A1 | 10/2022 | Smith et al. |
| 2022/0318617 A1 | 10/2022 | Wong et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | Mcphee et al. |
| 2023/0011451 A1 | 1/2023 | Lu |
| 2023/0048437 A1 | 2/2023 | Karbasi et al. |
| 2023/0083899 A1 | 3/2023 | Gandouet et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0153461 A1 | 5/2023 | Kalra et al. |
| 2023/0195734 A1 | 6/2023 | Cashion et al. |
| 2023/0196406 A1 | 6/2023 | Gandouet et al. |
| 2023/0208785 A1 | 6/2023 | Bae et al. |
| 2023/0244917 A1 | 8/2023 | Loaiza Ganem et al. |
| 2023/0244962 A1 | 8/2023 | Volkovs et al. |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351116 A1 | 11/2023 | Skaljin et al. |
| 2023/0368048 A1 | 11/2023 | Yang et al. |
| 2023/0377047 A1 | 11/2023 | Bouëtté et al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062117 A1 | 2/2024 | Kuang et al. |
| 2024/0106851 A1 | 3/2024 | Kennedy et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0249310 A1 | 7/2024 | Rai et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0428283 A1 | 12/2024 | Belbahri et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0022071 A1* | 1/2025 | Gutierrez ............... G06Q 50/01 |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045601 A1 | 2/2025 | Zuberi et al. |
| 2025/0053387 A1 | 2/2025 | Wang et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0071211 A1 | 2/2025 | Zhakov et al. |

(56)           References Cited

U.S. PATENT DOCUMENTS

| | | | |
|---|---|---|---|
| 2025/0077187 | A1 | 3/2025 | Guttridge et al. |
| 2025/0077188 | A1 | 3/2025 | Guttridge et al. |
| 2025/0077189 | A1 | 3/2025 | Guttridge et al. |
| 2025/0077190 | A1 | 3/2025 | Guttridge et al. |
| 2025/0077204 | A1 | 3/2025 | Guttridge et al. |
| 2025/0077227 | A1 | 3/2025 | Guttridge et al. |
| 2025/0077396 | A1 | 3/2025 | Sen |
| 2025/0077397 | A1 | 3/2025 | Sen |
| 2025/0077399 | A1 | 3/2025 | Sen |
| 2025/0077400 | A1 | 3/2025 | Sen |
| 2025/0077556 | A1 | 3/2025 | Guttridge et al. |
| 2025/0077681 | A1 | 3/2025 | Sen |
| 2025/0077682 | A1 | 3/2025 | Guttridge et al. |
| 2025/0077939 | A1 | 3/2025 | Tabatabaei et al. |
| 2025/0078324 | A1 | 3/2025 | Gormley |
| 2025/0078325 | A1 | 3/2025 | Gormley |
| 2025/0078344 | A1 | 3/2025 | Gormley |
| 2025/0078345 | A1 | 3/2025 | Gormley |
| 2025/0078972 | A1 | 3/2025 | Gormley |
| 2025/0085936 | A1 | 3/2025 | Guttridge et al. |
| 2025/0086096 | A1 | 3/2025 | Guttridge et al. |
| 2025/0086440 | A1 | 3/2025 | Erb et al. |
| 2025/0086441 | A1 | 3/2025 | Guttridge et al. |
| 2025/0086451 | A1 | 3/2025 | Guttridge et al. |
| 2025/0086551 | A1 | 3/2025 | Zhao |
| 2025/0094437 | A1 | 3/2025 | Upendran |
| 2025/0103609 | A1 | 3/2025 | Upendran |
| 2025/0103961 | A1 | 3/2025 | Cresswell et al. |
| 2025/0103980 | A1 | 3/2025 | Deljavan Farshi et al. |
| 2025/0104024 | A1 | 3/2025 | Abbas |
| 2025/0104029 | A1 | 3/2025 | Deljavan Farshi et al. |
| 2025/0104047 | A1 | 3/2025 | Mashkevich |
| 2025/0104050 | A1 | 3/2025 | Mashkevich |
| 2025/0104059 | A1 | 3/2025 | Mashkevich |
| 2025/0104074 | A1 | 3/2025 | Tsang et al. |
| 2025/0104306 | A1 | 3/2025 | Mashkevich |
| 2025/0104700 | A1 | 3/2025 | Henault-Ethier et al. |
| 2025/0106060 | A1 | 3/2025 | Gormley et al. |
| 2025/0106201 | A1 | 3/2025 | Gormley |
| 2025/0110805 | A1 | 4/2025 | Starszyk et al. |
| 2025/0117411 | A1 | 4/2025 | Mohammed |
| 2025/0117595 | A1 | 4/2025 | Taheri |
| 2025/0117596 | A1 | 4/2025 | Taheri |
| 2025/0117623 | A1 | 4/2025 | Devarajan et al. |
| 2025/0117629 | A1 | 4/2025 | Pandey et al. |
| 2025/0117630 | A1 | 4/2025 | Taheri |
| 2025/0117769 | A1 | 4/2025 | Taheri |
| 2025/0117836 | A1 | 4/2025 | Taheri et al. |
| 2025/0117853 | A1 | 4/2025 | Pandey et al. |
| 2025/0117854 | A1 | 4/2025 | Pandey et al. |
| 2025/0117855 | A1 | 4/2025 | Pandey et al. |
| 2025/0117856 | A1 | 4/2025 | Pandey et al. |
| 2025/0119396 | A1 | 4/2025 | Taheri |
| 2025/0119494 | A1 | 4/2025 | Pandey et al. |
| 2025/0119495 | A1 | 4/2025 | Pandey et al. |
| 2025/0124039 | A1 | 4/2025 | Cashion et al. |
| 2025/0124240 | A1 | 4/2025 | Luo et al. |
| 2025/0131718 | A1 | 4/2025 | Ma et al. |
| 2025/0138838 | A1 | 5/2025 | Ramesh et al. |
| 2025/0139267 | A1 | 5/2025 | Zykh et al. |
| 2025/0139382 | A1 | 5/2025 | Mohammed et al. |
| 2025/0139708 | A1 | 5/2025 | Bouëtté et al. |
| 2025/0147733 | A1 | 5/2025 | Abbas et al. |
| 2025/0148321 | A1 | 5/2025 | Stanevich et al. |
| 2025/0165375 | A1 | 5/2025 | Cresswell et al. |
| 2025/0165866 | A1 | 5/2025 | Cresswell et al. |
| 2025/0173170 | A1 | 5/2025 | Glynn-Udrow et al. |
| 2025/0173568 | A1 | 5/2025 | Cresswell et al. |
| 2025/0173618 | A1 | 5/2025 | Cresswell et al. |
| 2025/0173619 | A1 | 5/2025 | Cresswell et al. |
| 2025/0173725 | A1 | 5/2025 | Devarajan et al. |
| 2025/0181321 | A1 | 6/2025 | Gormley |
| 2025/0182028 | A1 | 6/2025 | Gormley |
| 2025/0182196 | A1 | 6/2025 | Gormley |
| 2025/0182222 | A1 | 6/2025 | Gormley |
| 2025/0191062 | A1 | 6/2025 | Heglin et al. |
| 2025/0217175 | A1 | 7/2025 | Karbasi et al. |
| 2025/0225560 | A1 | 7/2025 | Bajaj et al. |
| 2025/0231668 | A1 | 7/2025 | Tao et al. |
| 2025/0231750 | A1 | 7/2025 | Lim et al. |
| 2025/0231774 | A1 | 7/2025 | Tao et al. |
| 2025/0231775 | A1 | 7/2025 | Tao et al. |
| 2025/0231793 | A1 | 7/2025 | Lim et al. |
| 2025/0232130 | A1 | 7/2025 | Tao et al. |
| 2025/0232351 | A1 | 7/2025 | Tao et al. |
| 2025/0232375 | A1 | 7/2025 | Tao et al. |
| 2025/0232376 | A1 | 7/2025 | Tao et al. |
| 2025/0232377 | A1 | 7/2025 | Tao et al. |
| 2025/0232503 | A1 | 7/2025 | Lim et al. |
| 2025/0238536 | A1 | 7/2025 | Nikoghossian et al. |
| 2025/0245071 | A1 | 7/2025 | Ionescu et al. |
| 2025/0245511 | A1 | 7/2025 | D'Agostino et al. |

FOREIGN PATENT DOCUMENTS

| | | | |
|---|---|---|---|
| WO | 0001137 | A1 | 1/2000 |
| WO | 2024232973 | A1 | 11/2024 |

OTHER PUBLICATIONS

Ashktorab et al., "Resilient Chatbots: Repair Strategy Preferences for Conversational Breakdowns" CHI 2019, May 2, 2019, pp. 1-13 (YEAR: 2019).

\* cited by examiner

Figure 4:
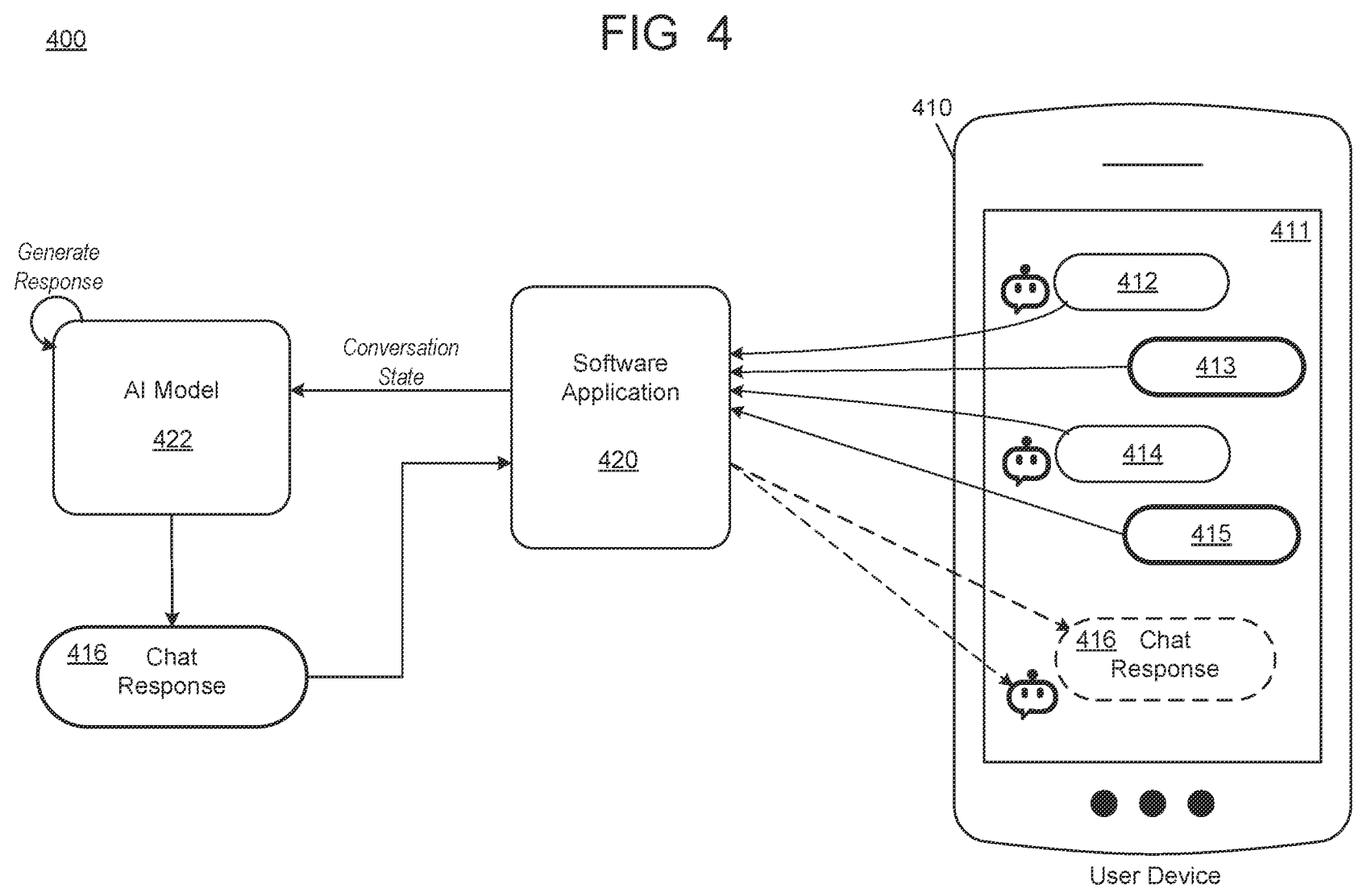

416 Chat Response

User Device

410

Software Application

420

Conversation State

Generate Response

AI Model

422

416 Chat Response

500A    FIG. 5A
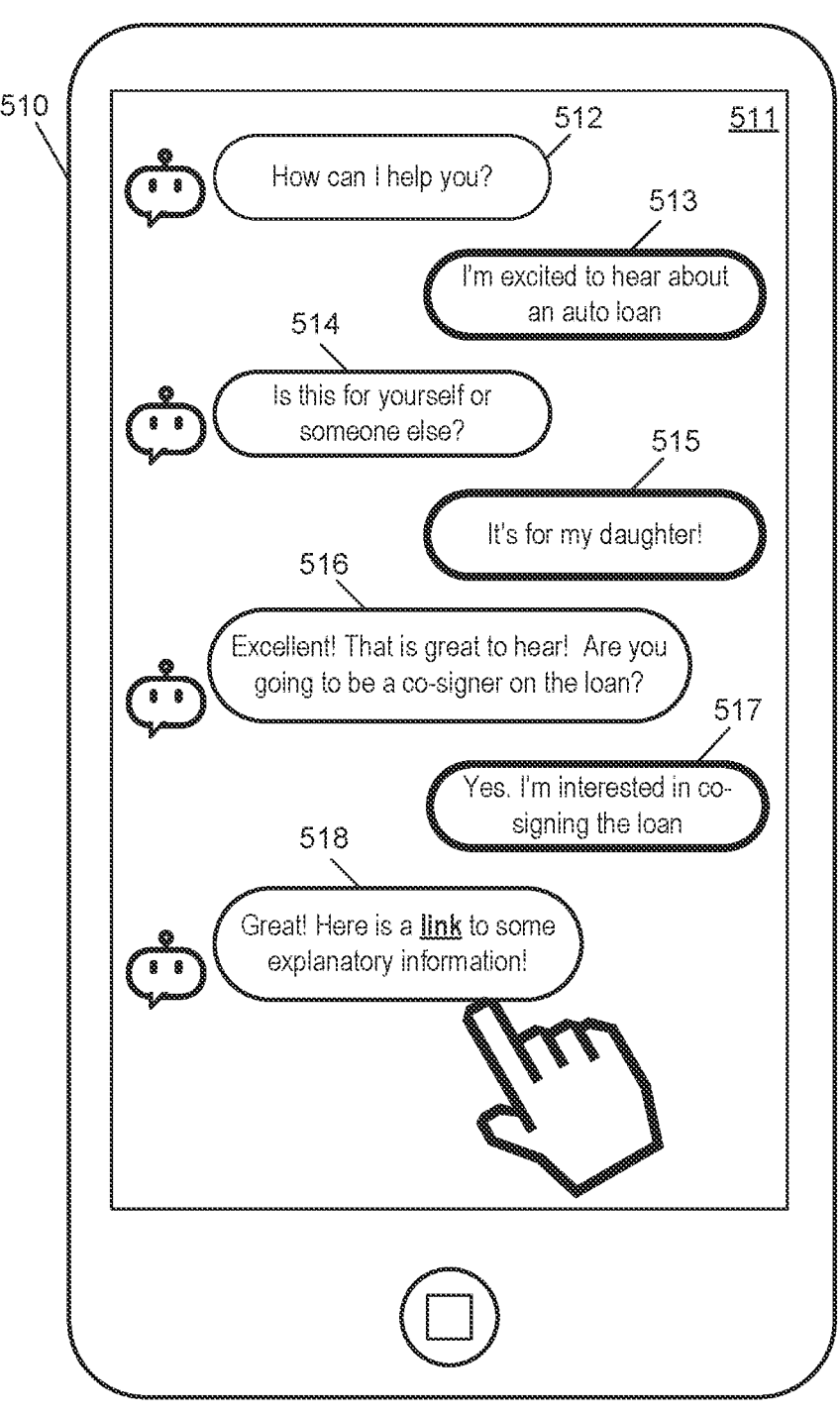
User Device

600A

User Device

Figure 6B:
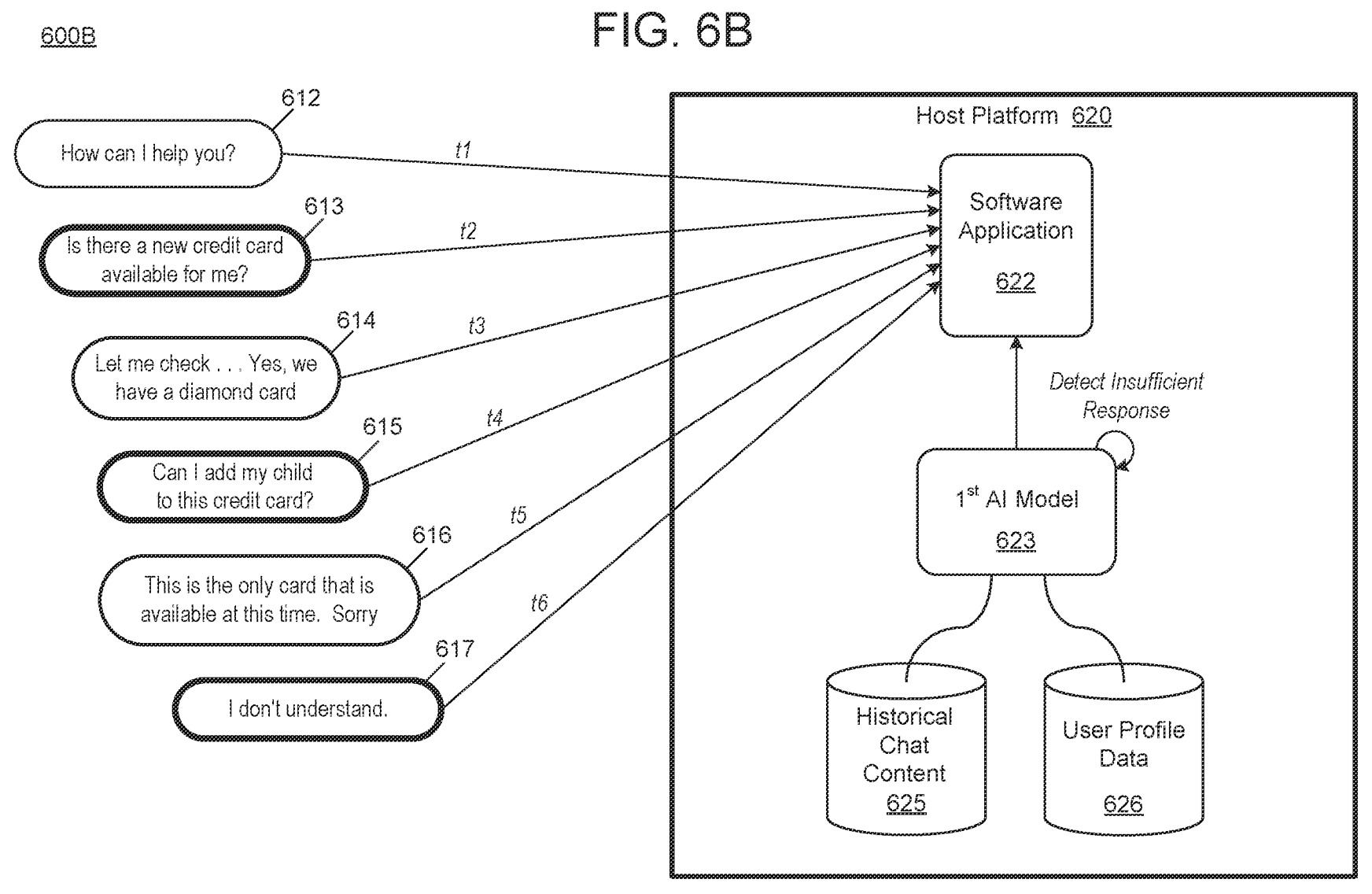

Host Platform 620

Software Application 622

Detect Insufficient Response

1st AI Model 623

Historical Chat Content 625

User Profile Data 626

612 How can I help you?

613 Is there a new credit card available for me?

614 Let me check . . . Yes, we have a diamond card

615 Can I add my child to this credit card?

616 This is the only card that is available at this time. Sorry

617 I don't understand.

t1 t2 t3 t4 t5 t6

600C

600D

User Device

700A

User Device

800                    FIG. 8A

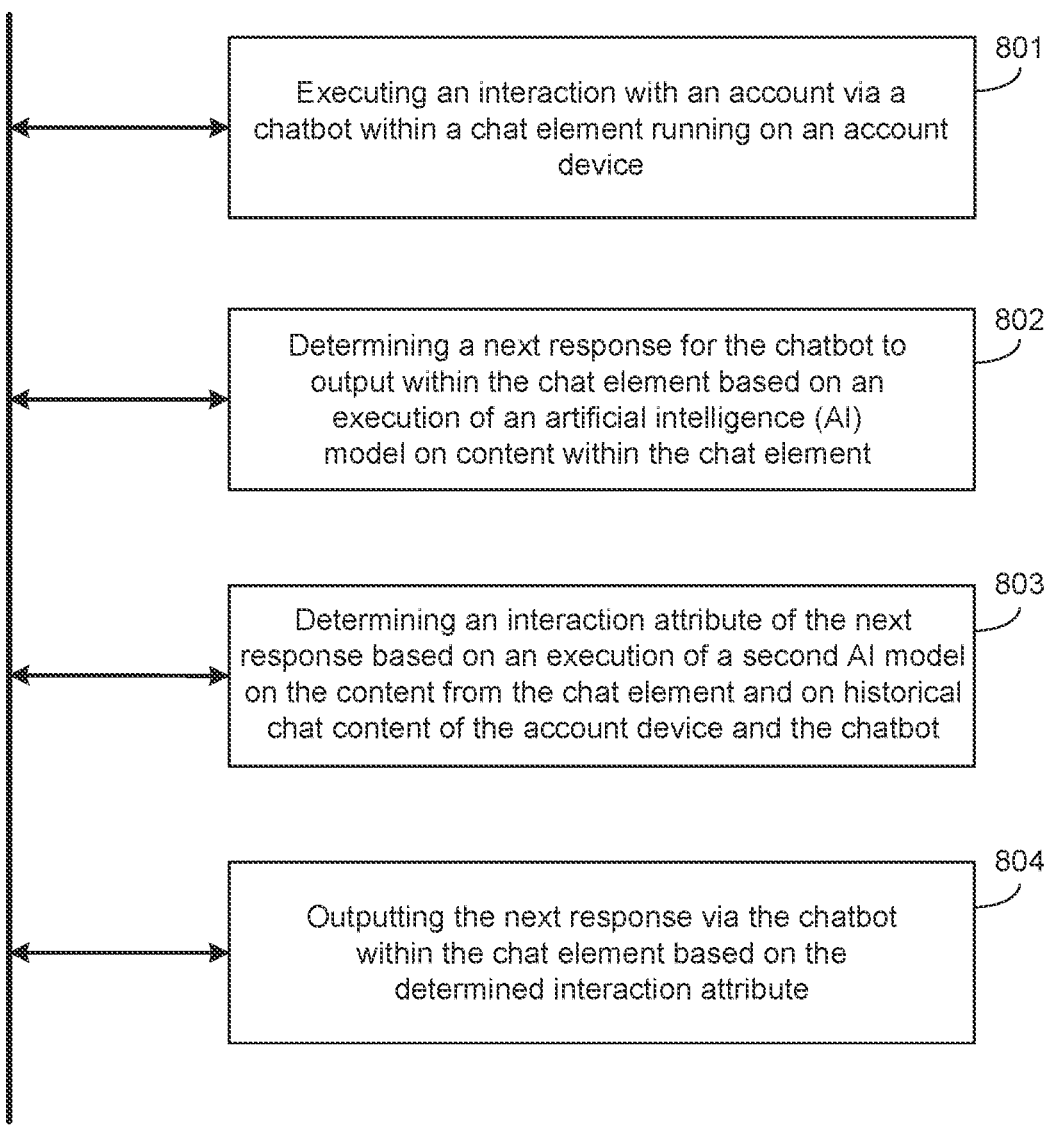

Executing an interaction with an account via a
chatbot within a chat element running on an account
device                                                    801

Determining a next response for the chatbot to
output within the chat element based on an
execution of an artificial intelligence (AI)
model on content within the chat element              802

Determining an interaction attribute of the next
response based on an execution of a second AI model
on the content from the chat element and on historical
chat content of the account device and the chatbot    803

Outputting the next response via the chatbot
within the chat element based on the
determined interaction attribute                      804

810    FIG. 8B

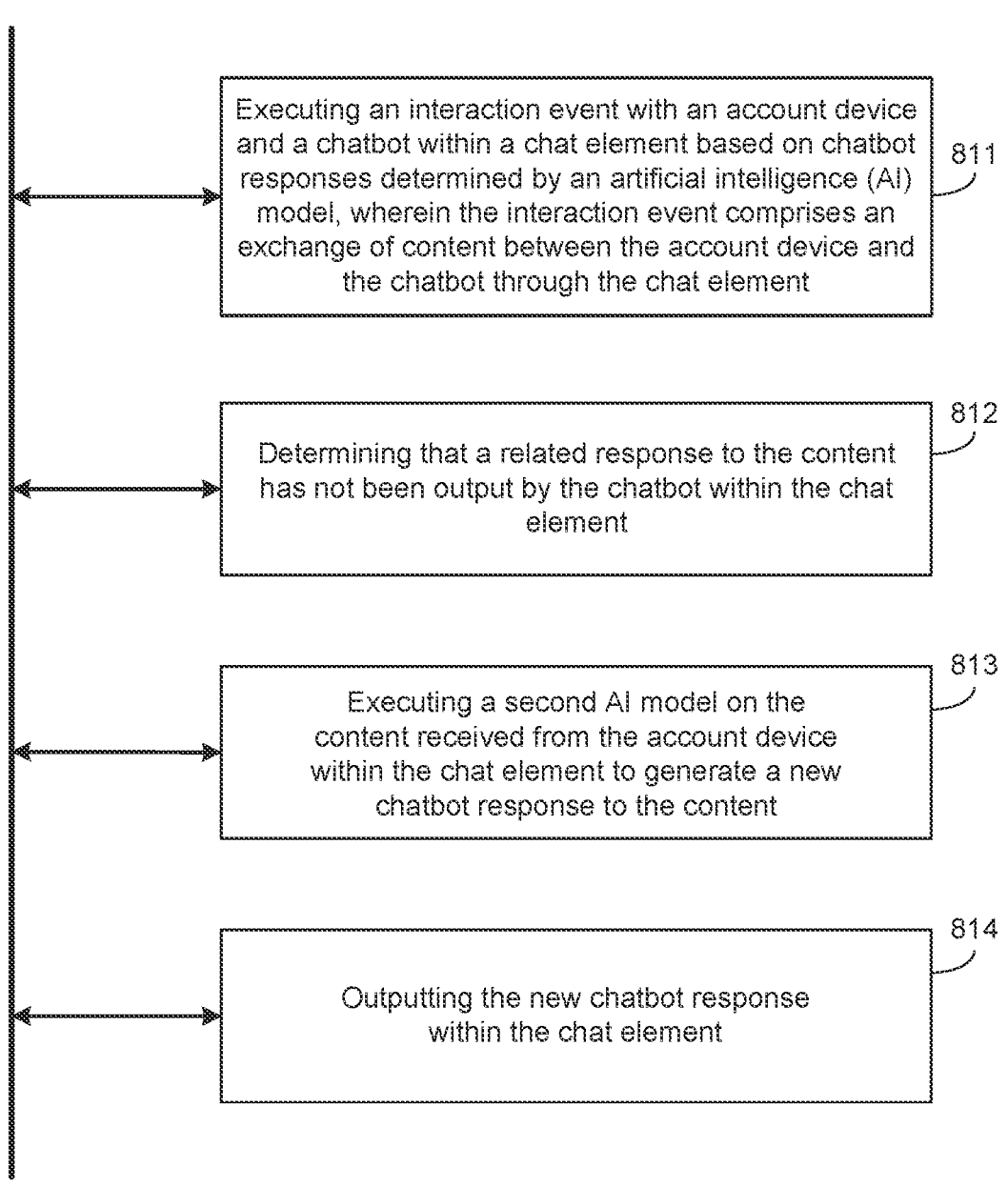

Executing an interaction event with an account device and a chatbot within a chat element based on chatbot responses determined by an artificial intelligence (AI) model, wherein the interaction event comprises an exchange of content between the account device and the chatbot through the chat element    811

Determining that a related response to the content has not been output by the chatbot within the chat element    812

Executing a second AI model on the content received from the account device within the chat element to generate a new chatbot response to the content    813

Outputting the new chatbot response within the chat element    814

820　　　　　　　　　　FIG. 8C

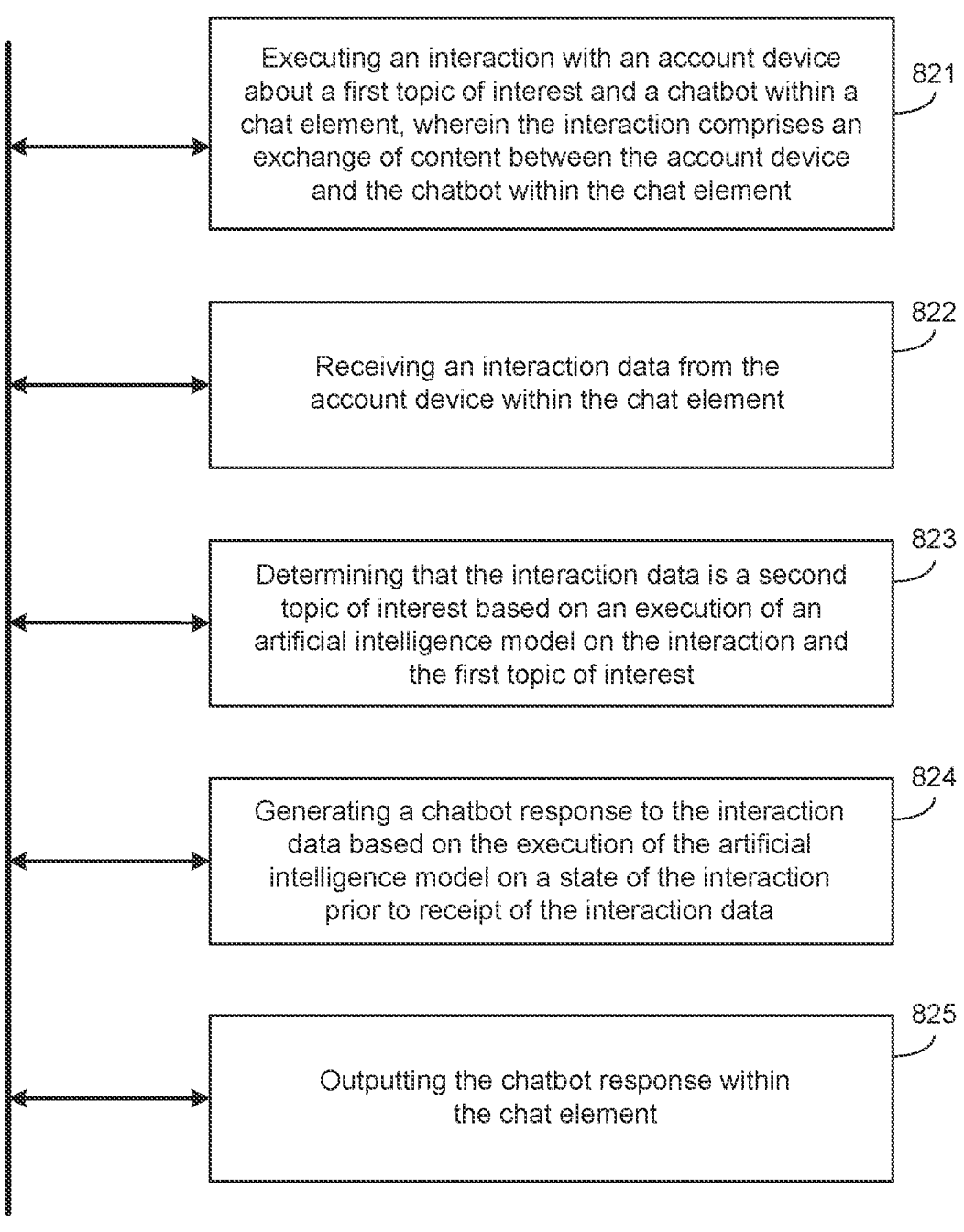

Executing an interaction with an account device about a first topic of interest and a chatbot within a chat element, wherein the interaction comprises an exchange of content between the account device and the chatbot within the chat element　　821

Receiving an interaction data from the account device within the chat element　　822

Determining that the interaction data is a second topic of interest based on an execution of an artificial intelligence model on the interaction and the first topic of interest　　823

Generating a chatbot response to the interaction data based on the execution of the artificial intelligence model on a state of the interaction prior to receipt of the interaction data　　824

Outputting the chatbot response within the chat element　　825

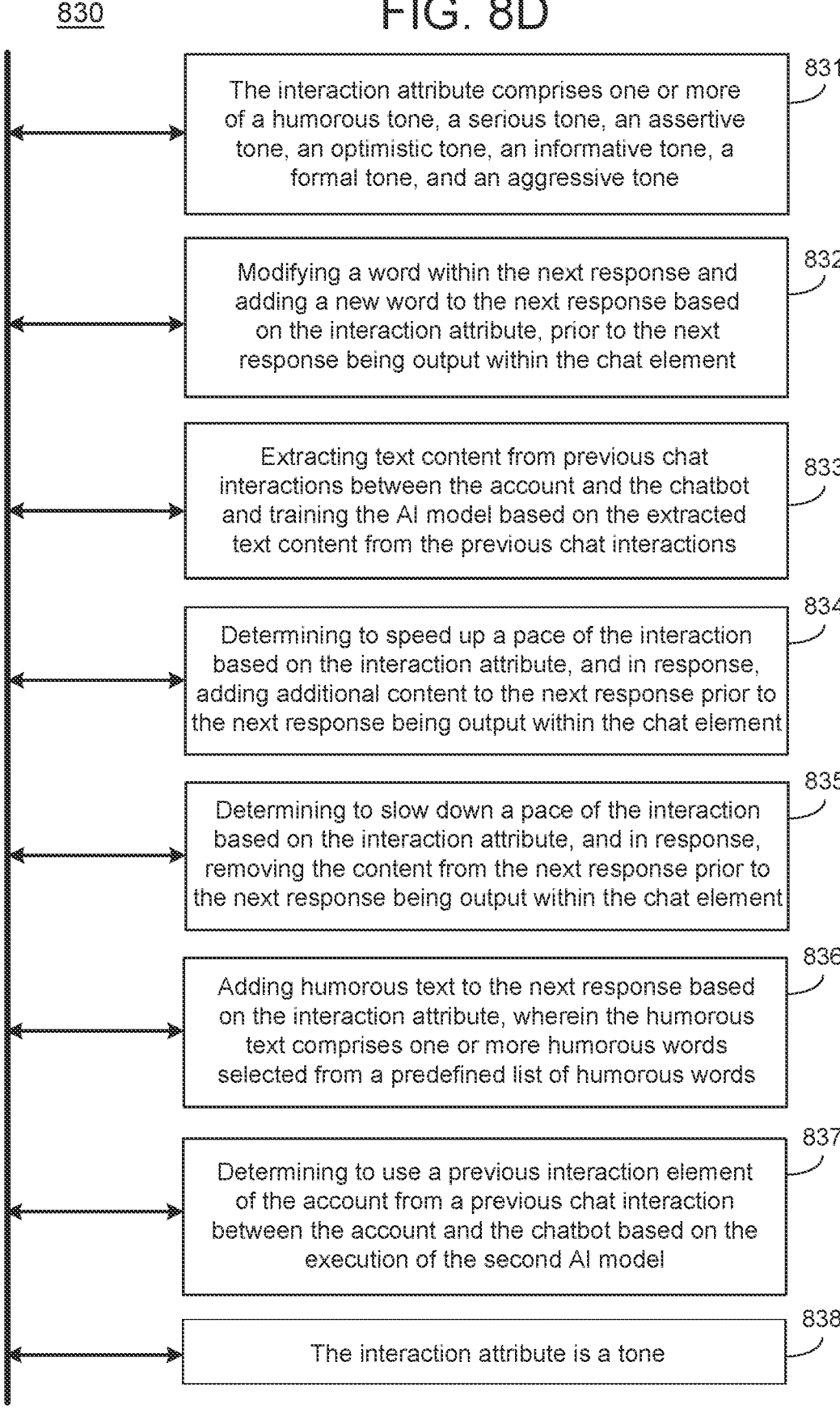

831 — The interaction attribute comprises one or more of a humorous tone, a serious tone, an assertive tone, an optimistic tone, an informative tone, a formal tone, and an aggressive tone 832 — Modifying a word within the next response and adding a new word to the next response based on the interaction attribute, prior to the next response being output within the chat element 833 — Extracting text content from previous chat interactions between the account and the chatbot and training the AI model based on the extracted text content from the previous chat interactions 834 — Determining to speed up a pace of the interaction based on the interaction attribute, and in response, adding additional content to the next response prior to the next response being output within the chat element 835 — Determining to slow down a pace of the interaction based on the interaction attribute, and in response, removing the content from the next response prior to the next response being output within the chat element 836 — Adding humorous text to the next response based on the interaction attribute, wherein the humorous text comprises one or more humorous words selected from a predefined list of humorous words 837 — Determining to use a previous interaction element of the account from a previous chat interaction between the account and the chatbot based on the execution of the second AI model 838 — The interaction attribute is a tone

840     FIG. 8E

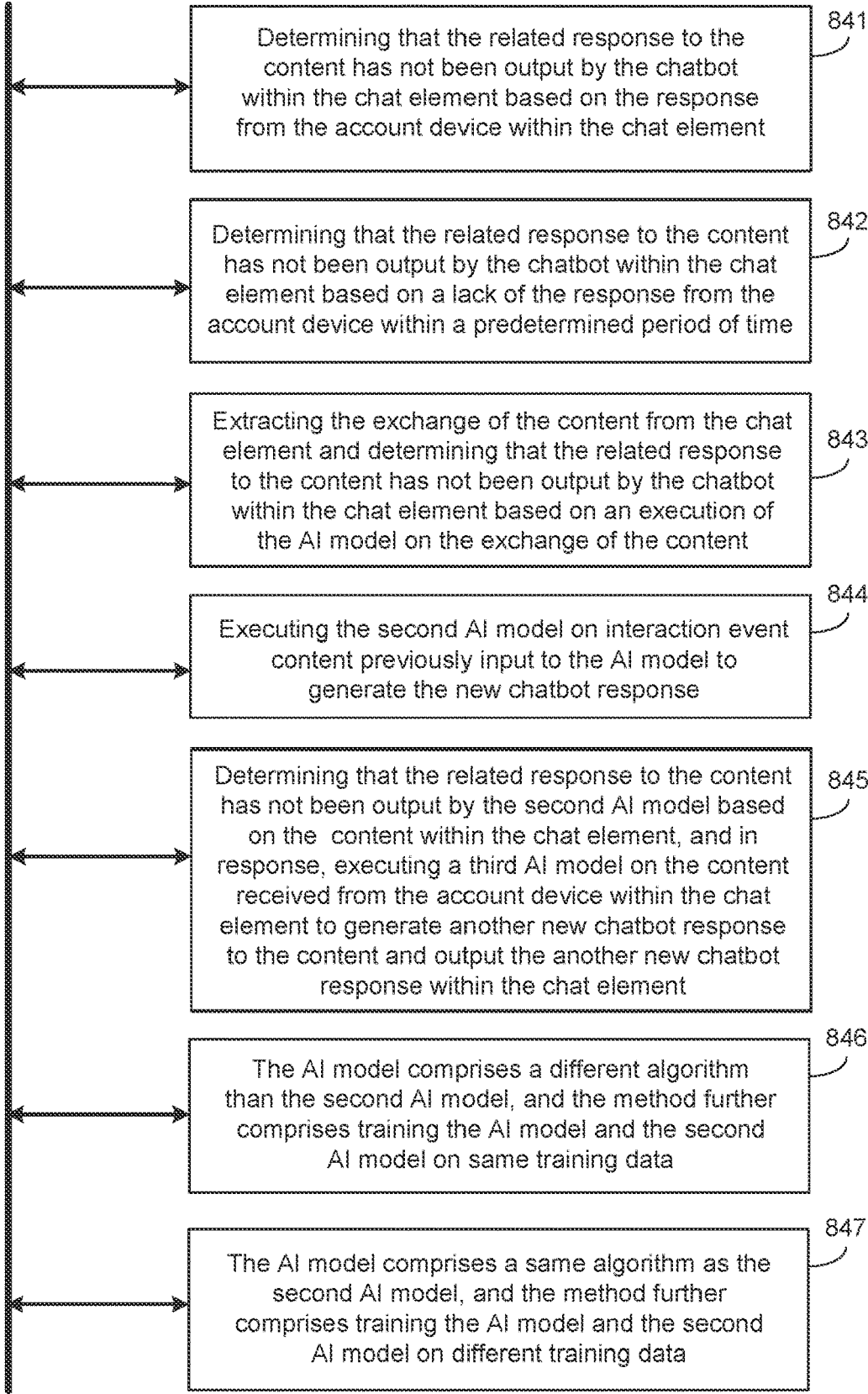

Determining that the related response to the content has not been output by the chatbot within the chat element based on the response from the account device within the chat element                    841

Determining that the related response to the content has not been output by the chatbot within the chat element based on a lack of the response from the account device within a predetermined period of time                    842

Extracting the exchange of the content from the chat element and determining that the related response to the content has not been output by the chatbot within the chat element based on an execution of the AI model on the exchange of the content                    843

Executing the second AI model on interaction event content previously input to the AI model to generate the new chatbot response                    844

Determining that the related response to the content has not been output by the second AI model based on the content within the chat element, and in response, executing a third AI model on the content received from the account device within the chat element to generate another new chatbot response to the content and output the another new chatbot response within the chat element                    845

The AI model comprises a different algorithm than the second AI model, and the method further comprises training the AI model and the second AI model on same training data                    846

The AI model comprises a same algorithm as the second AI model, and the method further comprises training the AI model and the second AI model on different training data                    847

850          FIG. 8F

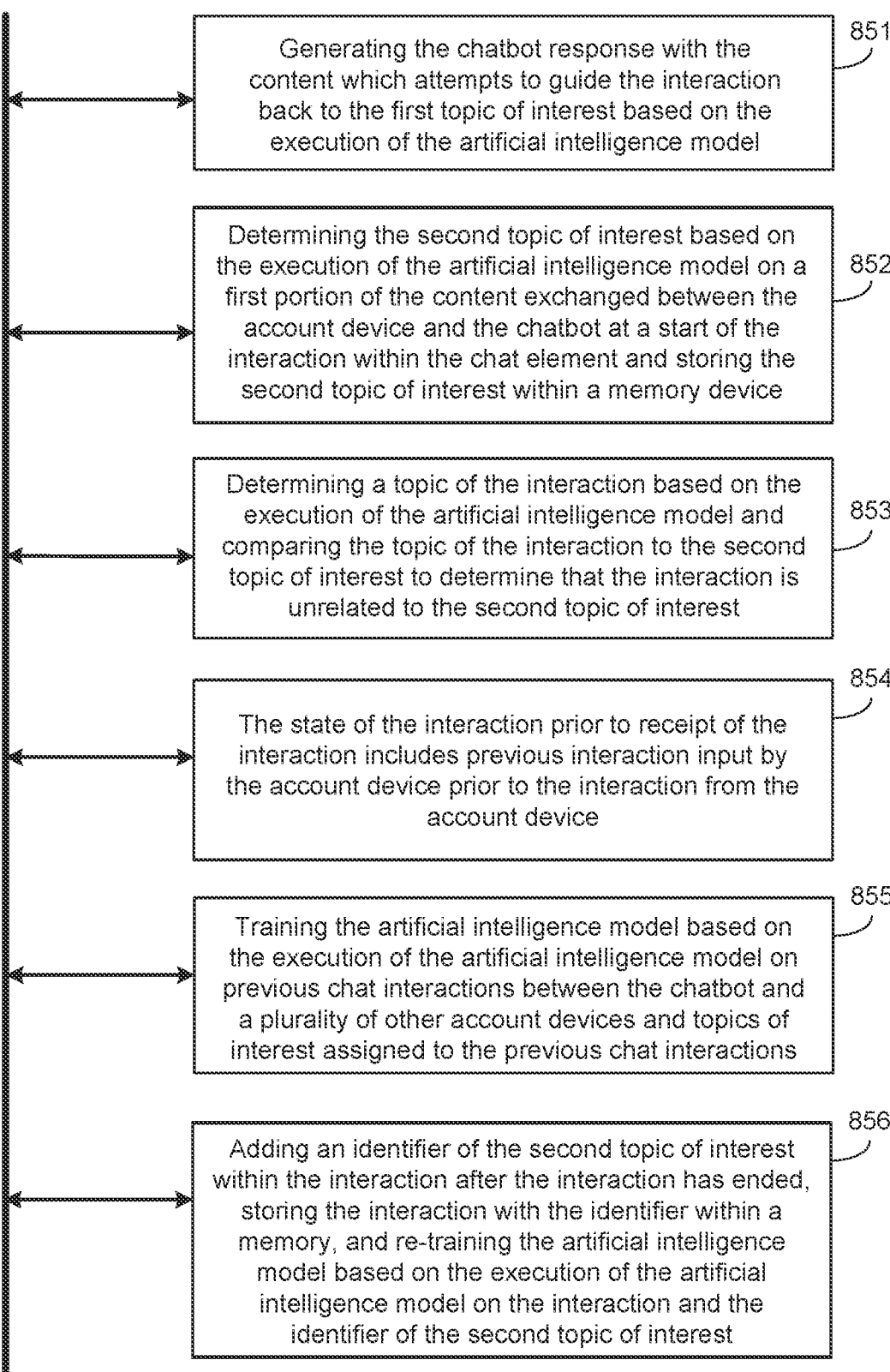

851
Generating the chatbot response with the content which attempts to guide the interaction back to the first topic of interest based on the execution of the artificial intelligence model 852
Determining the second topic of interest based on the execution of the artificial intelligence model on a first portion of the content exchanged between the account device and the chatbot at a start of the interaction within the chat element and storing the second topic of interest within a memory device 853
Determining a topic of the interaction based on the execution of the artificial intelligence model and comparing the topic of the interaction to the second topic of interest to determine that the interaction is unrelated to the second topic of interest 854
The state of the interaction prior to receipt of the interaction includes previous interaction input by the account device prior to the interaction from the account device 855
Training the artificial intelligence model based on the execution of the artificial intelligence model on previous chat interactions between the chatbot and a plurality of other account devices and topics of interest assigned to the previous chat interactions 856
Adding an identifier of the second topic of interest within the interaction after the interaction has ended, storing the interaction with the identifier within a memory, and re-training the artificial intelligence model based on the execution of the artificial intelligence model on the interaction and the identifier of the second topic of interest

900

CHATBOT WITH DYNAMIC CONVERSATIONAL TONE

BACKGROUND

Chatbots are a popular solution for organizations that wish to scale customer support while managing costs. Some of the benefits of chatbots are that they are fast and convenient, and they can provide a customer with access to answers around the clock. But chatbots also have limitations, especially when trying to address complex questions or situations. As a result, satisfaction with chatbots remains challenging in many situations. While most users are open to using a chatbot, the users often still prefer a live agent.

SUMMARY

One example embodiment provides an apparatus that may include a memory and a processor coupled to the memory, the processor configured to perform one or more of execute an interaction with an account via a chatbot within a chat element running on an account device, determine a next response for the chatbot to output within the chat element based on an execution of an artificial intelligence (AI) model on content within the chat element, determine an interaction attribute of the next response based on an execution of a second AI model on the content from the chat element and on historical chat content of the account device and the chatbot, and output the next response via the chatbot within the chat element based on the determined interaction attribute.

Another example embodiment provides a method that includes one or more of executing an interaction with an account via a chatbot within a chat element running on an account device, determining a next response for the chatbot to output within the chat element based on an execution of an artificial intelligence (AI) model on content within the chat element, determining an interaction attribute of the next response based on an execution of a second AI model on the content from the chat element and on historical chat content of the account device and the chatbot, and outputting the next response via the chatbot within the chat element based on the determined interaction attribute.

A further example embodiment provides a computer-readable medium comprising instructions, that when read by a processor, cause the processor to perform one or more of executing an interaction with an account via a chatbot within a chat element running on an account device, determining a next response for the chatbot to output within the chat element based on an execution of an artificial intelligence (AI) model on content within the chat element, determining an interaction attribute of the next response based on an execution of a second AI model on the content from the chat element and on historical chat content of the account device and the chatbot, and outputting the next response via the chatbot within the chat element based on the determined interaction attribute.

One example embodiment provides an apparatus that may include a memory and a processor coupled to the memory, the processor configured to perform one or more of execute a conversation with a user via a chatbot within a chat window based on chatbot responses determined by an artificial intelligence (AI) model, wherein the conversation comprises an exchange of content between the user and the chatbot through the chat window, determine that a related response to the content has not been output by the chatbot within the chat window, in response, execute a second AI model on the content received from the user within the chat window to generate a new chatbot response to the content, and output the new chatbot response within the chat window.

Another example embodiment provides a method that includes one or more of executing a conversation with a user via a chatbot within a chat window based on chatbot responses determined by an artificial intelligence (AI) model, wherein the conversation comprises an exchange of content between the user and the chatbot through the chat window, determining that a related response to the content has not been output by the chatbot within the chat window, in response, executing a second AI model on the content received from the user within the chat window to generate a new chatbot response to the content, and outputting the new chatbot response within the chat window.

A further example embodiment provides a computer-readable medium comprising instructions, that when read by a processor, cause the processor to perform one or more of executing a conversation with a user via a chatbot within a chat window based on chatbot responses determined by an artificial intelligence (AI) model, wherein the conversation comprises an exchange of content between the user and the chatbot through the chat window, determining that a related response to the content has not been output by the chatbot within the chat window, in response, executing a second AI model on the content received from the user within the chat window to generate a new chatbot response to the content, and outputting the new chatbot response within the chat window.

One example embodiment provides an apparatus that may include a memory and a processor coupled to the memory, the processor configured to perform one or more of execute a conversation with a user about a topic of interest through a chatbot within a chat window of a software application, wherein the conversation comprises an exchange of content between the user and the chatbot within the chat window, receive a chat communication from the user within the chat window, determine that the chat communication is unrelated to the topic of interest based on an execution of an artificial intelligence (AI) model on the chat communication and the topic of interest, generate a chatbot response to the chat communication based on the execution of the AI model on a state of the conversation prior to receipt of the chat communication, and output the chatbot response within the chat window.

Another example embodiment provides a method that includes one or more of executing a conversation with a user about a topic of interest through a chatbot within a chat window of a software application, wherein the conversation comprises an exchange of content between the user and the chatbot within the chat window, receiving a chat communication from the user within the chat window, determining that the chat communication is unrelated to the topic of interest based on an execution of an artificial intelligence (AI) model on the chat communication and the topic of interest, generating a chatbot response to the chat communication based on the execution of the AI model on a state of the conversation prior to receipt of the chat communication, and outputting the chatbot response within the chat window.

A further example embodiment provides a computer-readable medium comprising instructions, that when read by a processor, cause the processor to perform one or more of executing a conversation with a user about a topic of interest through a chatbot within a chat window of a software application, wherein the conversation comprises an exchange of content between the user and the chatbot within the chat window, receiving a chat communication from the user within the chat window, determining that the chat communication is unrelated to the topic of interest based on an execution of an artificial intelligence (AI) model on the chat communication and the topic of interest, generating a chatbot response to the chat communication based on the execution of the AI model on a state of the conversation prior to receipt of the chat communication, and outputting the chatbot response within the chat window.

BRIEF DESCRIPTION OF THE DRAWINGS

FIGS. 3A-3C are diagrams illustrating processes for training an AI model according to example embodiments.

FIG. 4 is a diagram illustrating a process of generating a chat response based on a state of a conversation between a chatbot and a user according to example embodiments.

FIGS. 5A-5C are diagrams illustrating a process of generating a chat response based on a tone of a conversation according to example embodiments.

FIGS. 6A-6D are diagrams illustrating a process of detecting an insufficient or unrelated chatbot response and handling the insufficient or unrelated chat response with a secondary AI model according to example embodiments.

FIG. 8A is a diagram illustrating a method of generating a chat response based on a tone of a conversation according to example embodiments.

FIG. 8B is a diagram illustrating a method of detecting and overcoming an insufficient or unrelated chatbot response according to example embodiments.

FIG. 8C is a diagram illustrating a method of guiding a chat conversation back to a topic of interest according to example embodiments.

FIG. 8D is an example flow diagram according to example embodiments.

FIG. 8E is another example flow diagram according to example embodiments.

FIG. 8F is another example flow diagram according to example embodiments.

DETAILED DESCRIPTION

Figure 1:
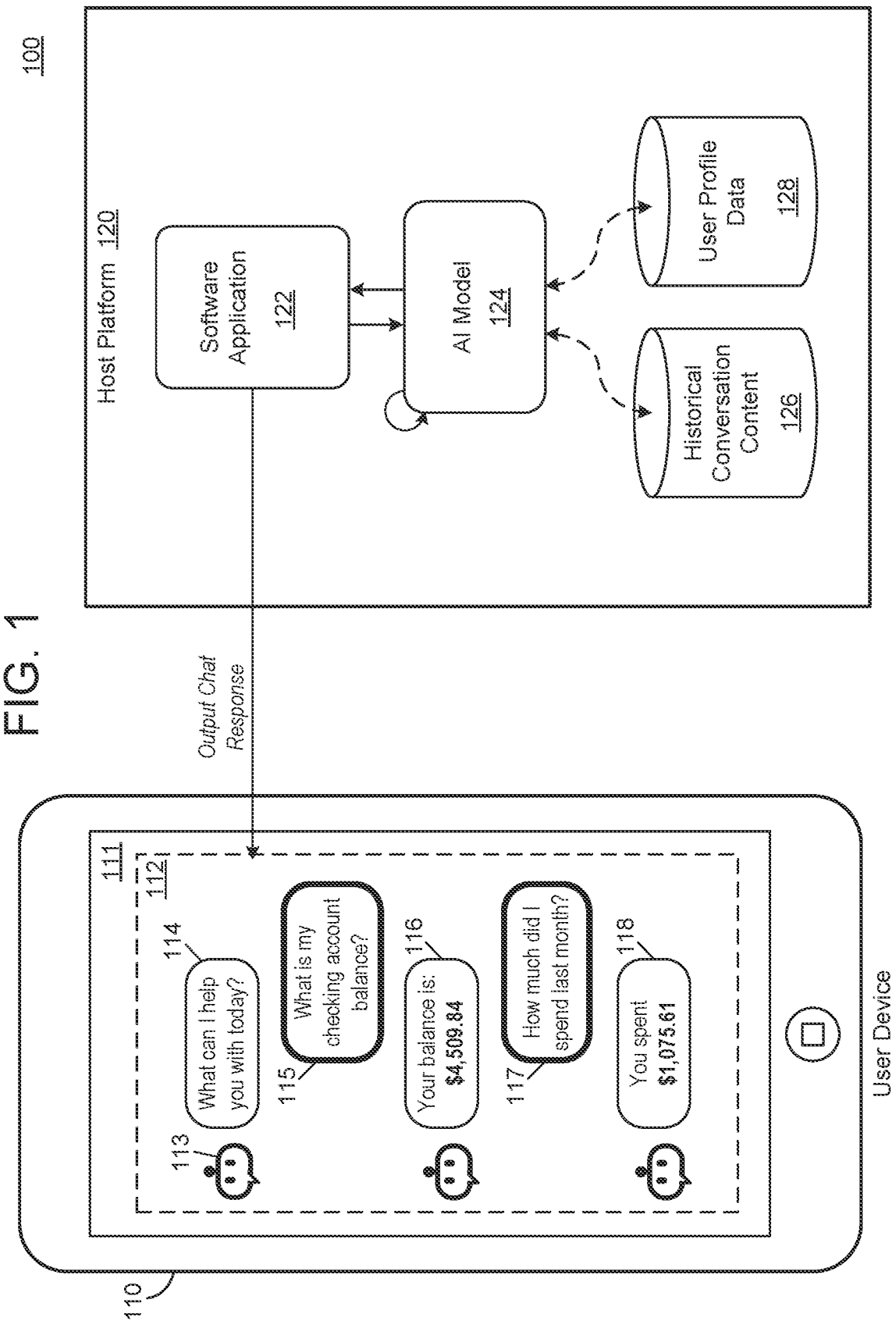
FIG. 1 is a diagram illustrating an artificial intelligence (AI) computing environment for chat conversations between a chatbot and a user according to example embodiments.

It is to be understood that although this disclosure includes a detailed description of cloud computing, implementation of the instant solution recited herein is not limited to a cloud computing environment. Rather, embodiments of the instant solution are capable of being implemented in conjunction with any other type of computing environment now known or later developed.

The example embodiments are directed to a platform which hosts a software application(s) that provides a chatbot functionality. Users can open a chat window on their device and conduct a chat conversation with the chatbot through the software application. The host platform may execute one or more artificial intelligence (AI) models to generate chatbot responses during the conversation between the user and the chatbot. In addition, the host platform may also execute the one or more AI models on a state of the chat conversation to identify attributes of the conversation and ensure that user satisfaction remains consistent throughout the conversation.

According to various embodiments, the host platform may use artificial intelligence to identify a "tone" of a chat conversation between a chatbot and a user. In this example, the chat responses output by the chatbot may be generated by a first AI model, while a tone of the conversation between the chatbot and the user may be identified by a second AI model. Once the tone has been identified, the second AI model may modify chat responses generated by the first AI model to ensure that the tone of the conversation between the chatbot and the user remains consistent. The use of multiple AI models (and AI engines driving the AI models) enables the tone-generating AI model to understand how the user generally reacts to responses received from the chatbot. Tone can include optimism, humor, pessimism, assertive, informal, formal, and the like.

According to various embodiments, the host platform may use artificial intelligence to identify when a chatbot has failed to provide a sufficient or related chat response to the user during a chat conversation and address the insufficient or unrelated chat response with a new/different chat response. For example, the host platform may execute a first AI model which generates chatbot responses for the chat conversation between the chatbot and the user. The host platform may also analyze the conversation to determine when a chatbot response has not sufficiently addressed the conversation with the user. Here, a lack of response from the user or an atypical response from the user may indicate that the user is not satisfied with the previous chatbot response.

In this example, the host platform may use one or more additional AI models, for example, an ensemble of AI models, to generate different chatbot responses to satisfy the user. For example, the one or more additional AI models may include different algorithms, different training data, different input data, or the like, which enable the one or more additional AI models to output different chatbot responses. Here, the one or more additional AI models may use a state of the conversation prior to the insufficient response to generate a new/different response to the user that is not affected by the previous insufficient chat response.

According to various embodiments, the host platform may use artificial intelligence to ensure that a chat conversation between the user and the chatbot remains on a topic of interest. If the user attempts to change the conversation to a different topic, the host platform may use an AI model to guide the conversation back to the original topic of interest. Here, the AI model may identify the original topic of interest during a first part of the conversation and continually check that the state of the conversation remains on the original topic of interest. If the user attempts to change the conversation to a different topic, the AI model may generate a chatbot response the subtly guides the conversation back to the original topic.

In the examples described herein, an AI model may be a "generative" AI (GenAI) model such as a large language model (LLM) or a multimodal large language model. As another example, the GenAI model may be a transformer neural network ("transformer"), or the like. The AI model may be trained to understand how to generate a new article of content from existing articles and to infuse user data into the new article of content. To do this, the AI model may take content from one or more articles of content, combine them into a single article, and infuse new content into the article that is specific to the user. Here, the AI model may include libraries and/or deep learning frameworks that enable the AI model to create realistic articles of content and display them as web pages.

FIG. 1 illustrates an AI computing environment 100 for executing chat conversations between a chatbot and a user according to example embodiments. Referring to FIG. 1, a host platform 120, such as a cloud platform, web server, etc., may host a software application 122 that provides a chat window with a chatbot that external users of the platform can conduct conversations with and receive valuable information. As one example, the software application 122 may be a financial-based software application that includes access to one or more financial accounts of a user, however, embodiments are not limited thereto.

In one embodiment, the chat window may be a chat element. The chat conversation may be a chat interaction and may be on a mobile device and may not be on an application but be on a subset of an application.

In the example of FIG. 1, a user may access the software application 122 with a user device 110 by connecting the user device 110 to the host platform 120 over a computer network. For example, the user device 110 may include a mobile device, a computer, a laptop, a desktop computer, or the like. The user device 110 may include a user interface 111 which can display/output a chat window 112 which includes a chatbot 113 that can output chat responses within the chat window in response to user input such as user requests, comments, queries, questions, and/or the like. The chatbot 113 may include an avatar, a picture, an icon, or the like, which is displayed within the chat window 112 each time a new chat response is generated by the AI model 124 and output within the chat window 112. In the example of FIG. 1, the chatbot 113 is displayed with an opening phrase 114 when the user opens the chat window 112 on the user interface 111 of the user device 110.

The user may input messages into the chat window 112 using input buttons, keyboard, etc. For example, in FIG. 1, the user inputs a query 115, which asks for an account balance. Here, the software application 122 may pass the query 115 to an AI model 124, which may generate a chatbot response to the query 115. The chatbot responses may be generated by one or more AI models, such as an AI model 124 hosted by the host platform 120. To generate a chatbot response, the AI model 124 may receive conversational content from the chat window 112, including messages input by the user and messages output by the chatbot 113. The AI model 124 may also use historical conversation content from a data store 126 and/or user profile data from a data store 128. In some embodiments, the historical conversation content may include historical conversations of the user and/or of other users of the software application 122 or other software applications. The user profile data may include user account information such as financial account information, transaction history, etc.

In FIG. 1, the AI model 124 generates a chatbot response 116 in response to the query 115 from the user and outputs the chatbot response 116 with the chatbot 113 via the chat window 112. Next, the user provides another query 117 which is input to the chat window 112. In response, the AI model 124 may receive the query 117 and may generate a chatbot response 118 and outputs the chatbot response 118 via the chat window 112. To generate a chatbot response, the AI model 124 may use the most recent input from the user. In some cases, the AI model 124 may also use the previous conversation state, including the previous messages input by the user within the chat window 112 and the previous chatbot responses output by the AI model 124. This enables the AI model 124 to generate a response based on a total conversation with the user, not just a most recent input from the user.

According to various embodiments, the software application 122 may be a mobile application with a front-end installed on the user device 110 and a backend installed on the host platform 120. As another example, the software application 122 may be a progressive web application (PWA) hosted by the host platform 120 and made accessible via a browser on the user device 110.

The AI model 124 may be trained to generate chatbot responses through training. During the training process, the AI model 124 may ingest chat content from different sources, including external host servers, websites, previous chat conversations of the user and/or of other users, and the like. In addition, the AI model 124 may also ingest user data during the training process such as financial account data of the user from the user profile data store 128. Furthermore, the AI model 124 may be retrained on chatbot responses generated by the AI model 124 and responses from the user to the chatbot responses. Although not shown in FIG. 1, the host platform 120 may also include one or more additional models, including one or more machine learning models, one or more AI models, one or more additional GenAI models, and the like. The models may be stored within a model repository (not shown).

Figure 2:
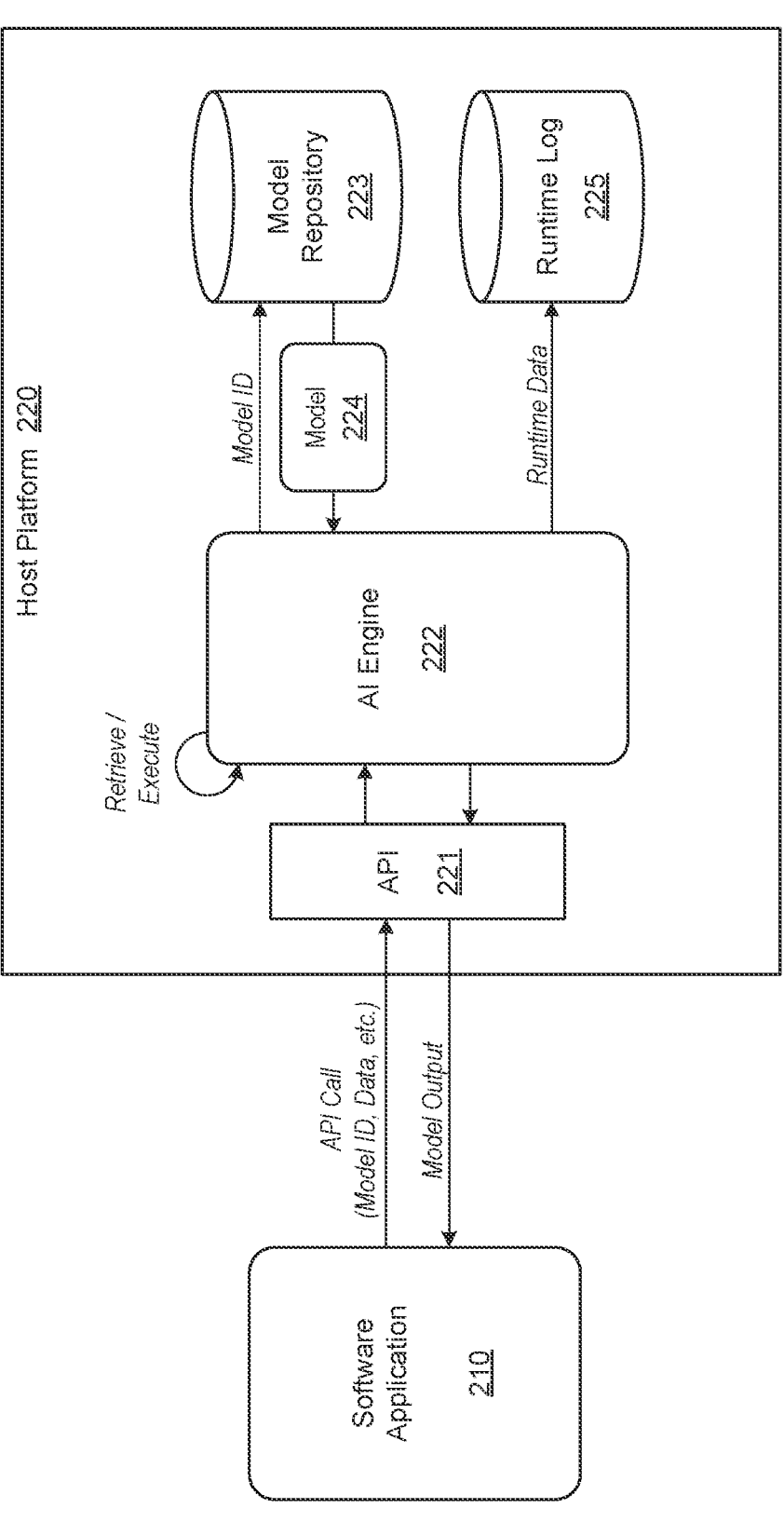
FIG. 2 is a diagram illustrating a process of executing an AI model on input content according to example embodiments.

FIG. 2 illustrates a process 200 of executing a model 224 on input content according to example embodiments. As an example, model 224 may be a generative AI model. However, embodiments are not limited thereto. Referring to FIG. 2, a software application 210 may request execution of the model 224 by submitting a request to the host platform 220. For example, the request may include an application programming interface (API) call or other submission identifiers of model data, such as an identifier of the model to be executed, a payload of data to be input to the model during execution, an expected output, a storage location for the expected output, and the like. In response, an AI engine 222 may receive the request, retrieve the model 224 from a model repository 223, and trigger the model 224 to execute within a runtime environment of the host platform 220.

In FIG. 2, the AI engine 222 may control access to models that are stored within the model repository 223. For example, the models may include AI models, machine learning models, neural networks, and/or the like. The software application 210 may trigger execution of the model 224 from the model repository 223 via invocation to an API 221 of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the payload of data may be in a format that cannot be input to the model 224 nor read by a computer processor. For example, the payload of data may be in text format, image format, audio format, and the like, such as content from a web page or other format where articles are displayed publicly on the Internet. In response, the AI engine 222 may convert the payload of data into a format that is readable by the model 224 such as a vector or other encoding. The vector may then be input to the model 224.

In some embodiments, the software application 210 may display a user interface that enables a user thereof to provide feedback from the output provided by model 224. For example, a user may input a confirmation that an article generated by the model 224 is relevant to the user's interest. This information may be added to the execution results and stored within a runtime log 225. The runtime log 225 may include an identifier of the input, an identifier of the output, an identifier of the model used, and feedback from the recipient. This information may be used to subsequently re-train the model by executing the model 224 on the input, the output, the model used, the feedback, and/or the like.

In the example of FIG. 2, one AI engine is shown; however, it should be appreciated that the host platform 220 may host multiple AI engines capable of training multiple models at the same time. For example, multiple AI engines may train multiple AI models to generate chatbot responses. Here the multiple AI models may be different, for example, different algorithms. As another example, the multiple AI models may be based on the same algorithm but trained using different training data. This results in multiple AI models capable of responding differently to the same query from a user.

Figure 3A:
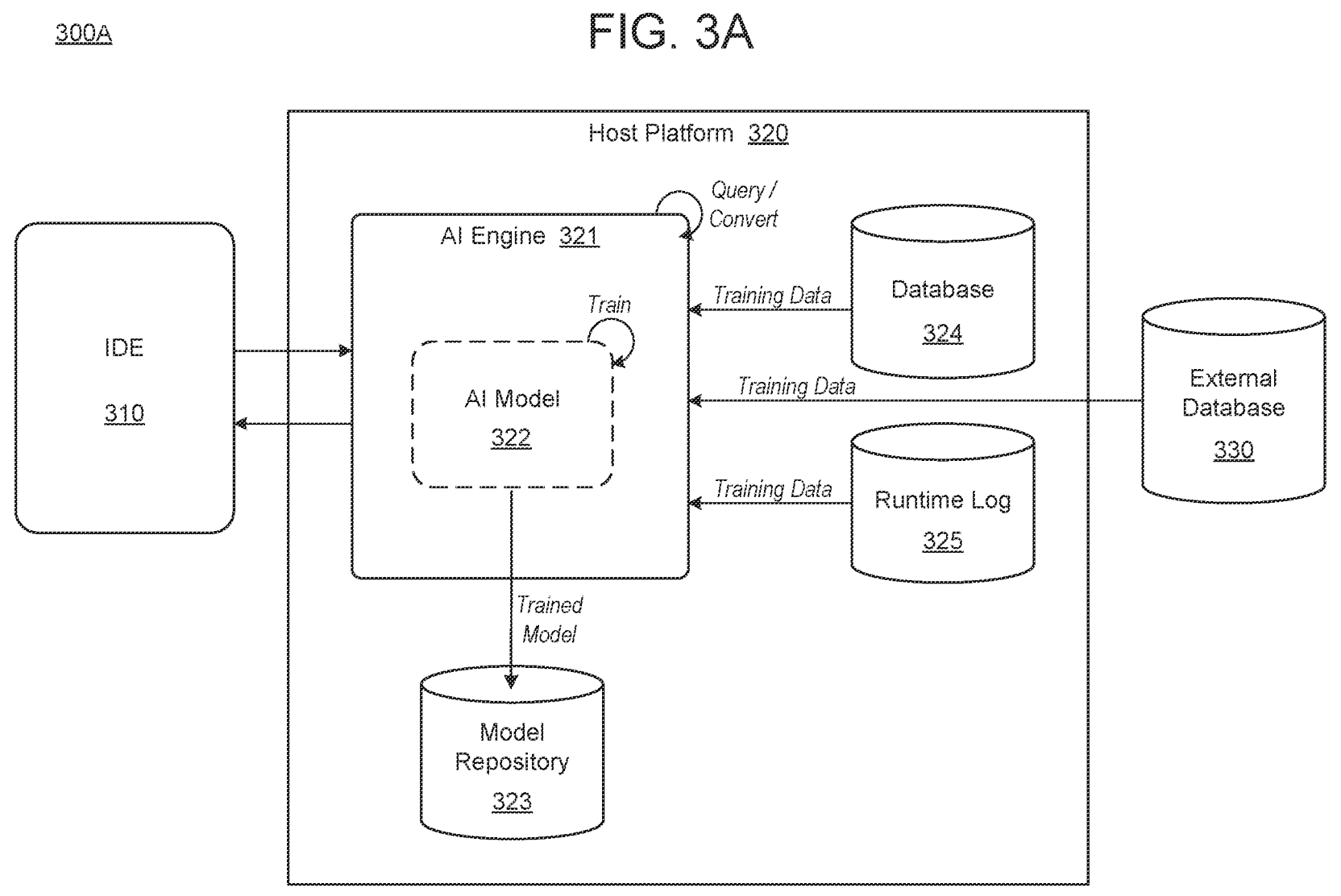

FIG. 3A illustrates a process 300A of training an AI model 322 (e.g., a GenAI model, etc.) according to example embodiments. However, it should be appreciated that the process 300A shown in FIG. 3A also applies to other models such as machine learning models, statistical models, and the like. Referring to FIG. 3A, a host platform 320 may host an IDE 310 (integrated development environment) where models may be developed, trained, retrained, and the like. In this example, the IDE 310 may include a software application with a user interface accessible by a user device (not shown) over a network or through a local connection. For example, the IDE 310 may be embodied as a web application that can be accessed at a network address, uniform resource locator (URL), etc., by a device. As another example, the IDE 310 may be locally or remotely installed on a computing device where it is accessed and used locally.

The IDE 310 may be used to design an AI model 322 (via a user interface of the IDE 310) that can receive text as input and generate chatbot responses displayed on a graphical user interface/chat window of a software application. As another example, the model may be trained to determine a tone of a chat conversation between a chatbot and a user. As another example, the model may be trained to determine whether a chatbot response is insufficient or unrelated. The model can be executed/trained based on the training data established via the user interface. For example, the user interface may be used to build a new model. The training data for training such a new model may be provided from a training data store such as a database 324, which includes training samples (e.g., historical chat content, insufficient response examples, conversational tone examples, etc.) from the web, from users of one or more software applications, and the like. As another example, the training data may be pulled from one or more external databases 330 such as publicly available sites, etc.

During training, the AI model 322 may be executed on training data via an AI engine 321 of the host platform 320. The training data may include a large corpus of articles, posts, reviews, comments, and the like, which a user can read. Furthermore, the training data may also include user data. In the example embodiments, the training data may include publicly available articles that have been crawled or otherwise obtained from a website or the like. However, embodiments are not limited thereto. The AI model 322 may learn how to generate chatbot responses based on previous conversations of a particular user or of multiple users. When fully trained, the model may be stored within the model repository 323 via the IDE 310 or the like.

As another example, the IDE 310 may be used to retrain the AI model 322 after the model has already been deployed. The retraining process may use executional results that have already been generated/output by the AI model 322 in a live environment (including any user feedback, etc.) to retrain the AI model 322. For example, chatbot responses that were well-received and chatbot responses that were insufficient, unrelated, etc., generated by the AI model 322 and user feedback about the chatbot responses may be used to retrain the model to further enhance the chatbot responses that are generated by the AI model 322. The feedback may include indications of whether a chatbot response is sufficient or insufficient, as well as relevant or unrelated. This data may be captured and stored within a runtime log 325 or other data store within the live environment and can be subsequently used to retrain the AI model 322.

Figure 3B:
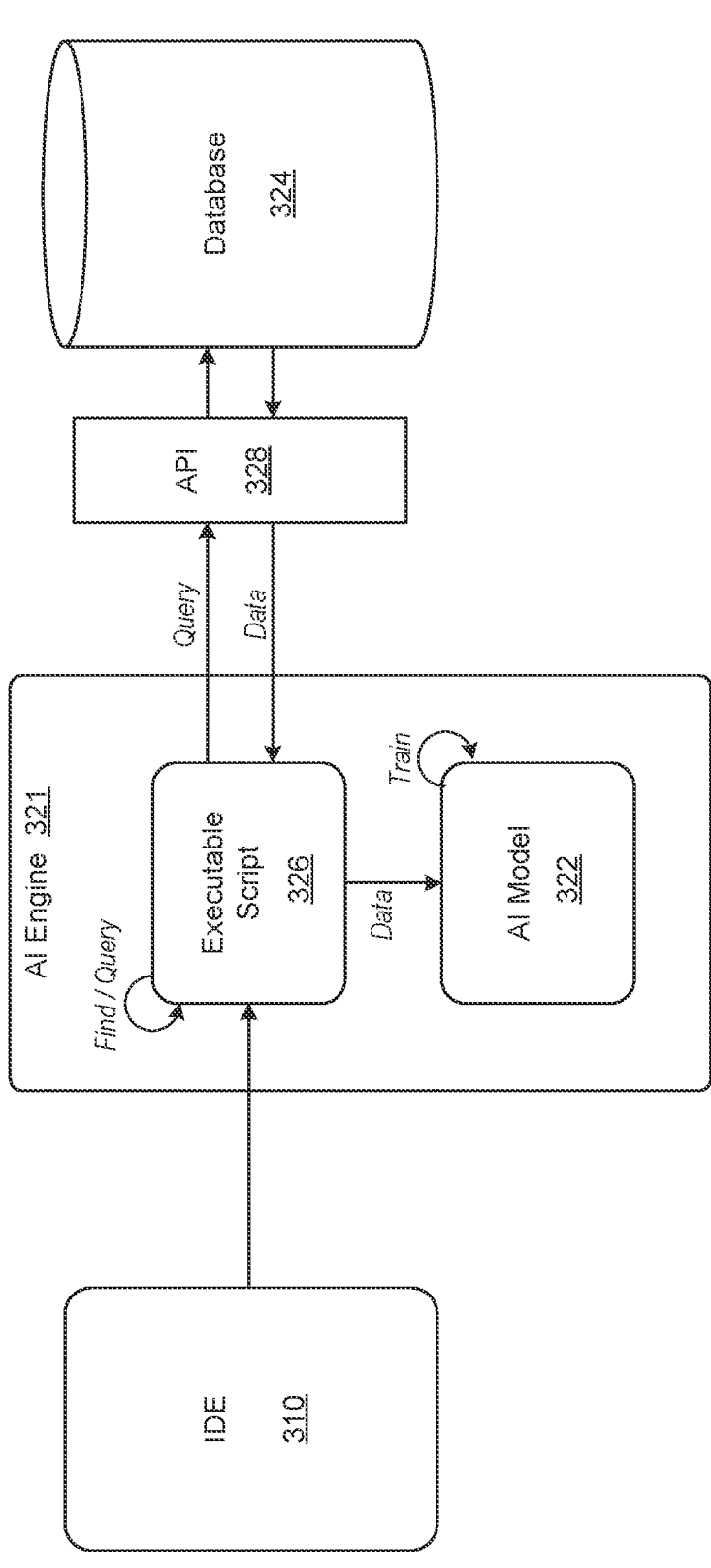

FIG. 3B illustrates a process 300B of executing a training process for training/retraining the AI model 322 via an AI engine 321. In this example, an executable script 326 is developed and configured to read data from a database 324 and input the data to the AI model 322 while the AI model 322 is running/executing via the AI engine 321. For example, the executable script 326 may use identifiers (IDs) of data locations (e.g., table IDs, row IDs, column IDs, topic IDs, object IDs, etc.) to identify locations of the training data within the database 324 and query an API 328 of the database 324. In response, the database 324 may receive the query, load the requested data, and return the data to the executable script 326, where it is input to the AI model 322. The process may be managed via a user interface of the IDE 310, allowing for supervised learning during the training process. However, it should also be appreciated that the system is capable of unsupervised learning.

The script 326 may iteratively retrieve additional training data sets from the database 324 and iteratively input the additional training data sets into the AI model 322 during the execution of the model to continue to train the model. The script may continue until instructions within the script direct the script to terminate, which may be based on a number of iterations (training loops), total time elapsed during the training process, etc.

Figure 3C:
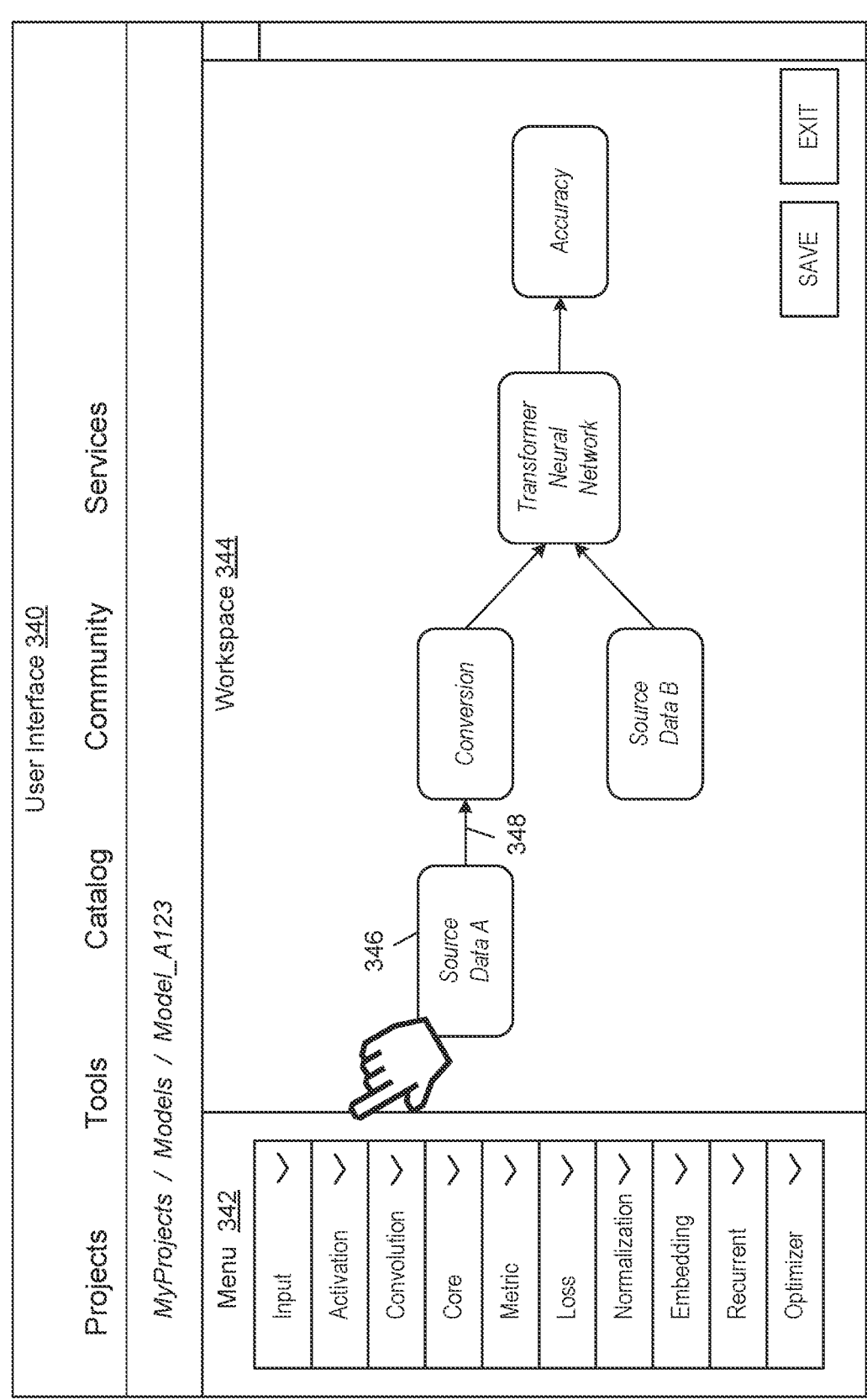

FIG. 3C illustrates a process 300C of designing a new AI model via a user interface 340 according to example embodiments. For example, the user interface 340 may be output as part of the software application that interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options, which can be selected to reveal additional components that can be added to the model design shown in the workspace 344. Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a flow of a new model within the workspace 344. For example, the user may connect the node 346 to another node in the flow via an edge 348, creating a dependency within the flow. When the user is done, the user can save the model for subsequent training/ testing.

FIG. 4 illustrates a process 400 of generating a chat response based on a state of a conversation between a chatbot and a user according to example embodiments. Referring to FIG. 4, an AI model 422 may be hosted by a host platform (not shown) and may be part of a software application 420 that is also hosted on the host platform. Here, the software application 420 may establish a connection, such as a secure network connection, with a user device 410. The secure connection may be established by the user device 410 uploading a personal identification number (PIN), biometric scan, password, username, secure sockets layer (SSL)/transport layer security (TLS) handshake, etc. In response to the user activating a chat function of the software application 420, a chat window 411 may be displayed on a user interface of the user device 410. In this example, the chat window 411 includes an opening phrase 412, a message 413 input by the user, a chatbot response 414, and a message 415 input by the user.

In the example of FIG. 4, the software application 420 may control the interaction of the AI model 422 on the host platform and the user device 410. In this example, the software application 420 may extract content from the chat window 411, including messages, pictures, pauses between communications, and the like, and input this information to the AI model 422. In some embodiments, the software application 420 may extract the entire conversation between the chatbot and the user from the chat window 411. In FIG. 4, this may include the opening phrase 412, the message 413, the chatbot response 414, and the message 415. As another example, the software application 420 may only extract a subset of the conversation but not the entire conversation, such as an initial portion of the conversation, a most recent communication, or some other desired portion of the conversation, and use the subset of the conversation to generate a response.

In the example of FIG. 4, the software application 420 may extract the communications (e.g., the opening phrase 412, the message 413, the chatbot response 414, and the message 415, etc.), and input them to the AI model 422. The AI model 422 may generate a new chatbot response 416. The new chatbot responses 416 may be output in sequence in the chat window 411 of the user device 410. In some embodiments, the AI model 422 may ingest additional contextual data besides historical chat content. The additional contextual data may include conversations labeled with a tone, conversations labeled as insufficient or unrelated, conversations labeled with a topic of interest, and the like.

According to various embodiments, an AI model may be trained on a chatbot conversation to determine a next chatbot response to output. In some embodiments, a second AI model may be trained to determine a conversational tone of at least one of a chat input by a user, a sequence of chat communications, a conversation state, and the like. In this example, the AI model may generate a next chatbot response and the second AI model may modify the chatbot response based on the determined tone before outputting the chatbot response within the chat window. In this example, the AI model can predict the next response in an active conversation between the chatbot and the user.

For example, the model may ingest conversation content from the chat window and determine a chatbot response. Next, the second AI model may determine the tone with which the chatbot will respond based on the same conversation content. The second AI model may ingest the conversation thread from the chatbot along with historical chat sessions between the chatbot and the user, and the like. This enables the second AI model to understand how the user generally reacts to responses received from a chatbot. For example, the second AI model may determine if the user has an optimistic tone, a pessimistic tone, an informal tone, a formal tone, a humorous tone, etc. The software may combine the predicted response and the determined tone to output a final message in the chat window. In this manner, the chatbot can keep the conversational flow going in a style that makes the user comfortable, making the chat conversation more contextually relevant and appropriate.

In some embodiments, an AI model may be trained to determine whether a chatbot response is sufficient. Here, the AI model may generate a chatbot response and output the chatbot response in the chat window. The AI model may also determine whether or not the response is sufficient or related to the conversation based on a response from the user, a pause or lack of response, a question, or the like. In this example, the host platform may include one or more additional AI models trained on the chatbot conversation, which can output a different suggested response within the chat window based on the state of the conversation prior to the insufficient or unrelated chat response being output.

The objective is to prevent the conversation from going into a "death spiral," which is common for chatbots that only rely on a single AI model to generate chat responses. In the example embodiments, the solution uses an ensemble learning approach, where multiple models are combined to improve the overall prediction accuracy and robustness. Ensemble learning often results in better performance as it mitigates the individual weaknesses of the models involved. Initially, a user interacts with a chatbot to input a conversation or question. A primary generative AI model processes the input and generates a response. This response is then evaluated; additional models are invoked if the response is deemed insufficient, irrelevant, or below a certain quality threshold. These additional models generate their responses based on the same input. The outputs from the different models may be used to resume the conversation before the insufficient response. Accordingly, a more accurate and contextually relevant final response is selected.

In some embodiments, an AI model may be trained on a chatbot conversation with a user to communicate about a topic of interest. The model can detect when the discussion has deviated from the topic of interest and generates a response to steer the conversation back to the topic of interest. The AI model may identify deviations in a conversational thread that are not relevant to the topic of interest for the chat session. To accomplish this, the model can discern the primary subject of a conversation and tag or label it.

The topic identification process may occur early in the conversation, such as during a first or a first couple of inputs from the user. As the dialogue progresses, the system continuously monitors each message to ensure adherence to the topic of interest by determining the topic of the input message and comparing it against the topic of interest. If a message is determined to deviate from the topic of interest, the AI model may generate a new chat response for the chatbot that is designed to steer the conversation back to the original topic of interest. This generated response is then displayed to the user via the chat interface, gently guiding them back to the main conversation thread. This solution has many benefits, including increased productivity and efficiency. Keeping users focused on the topic can reduce the time spent chatting, deliver answers faster, and enhance the user experience.

Figure 5B:
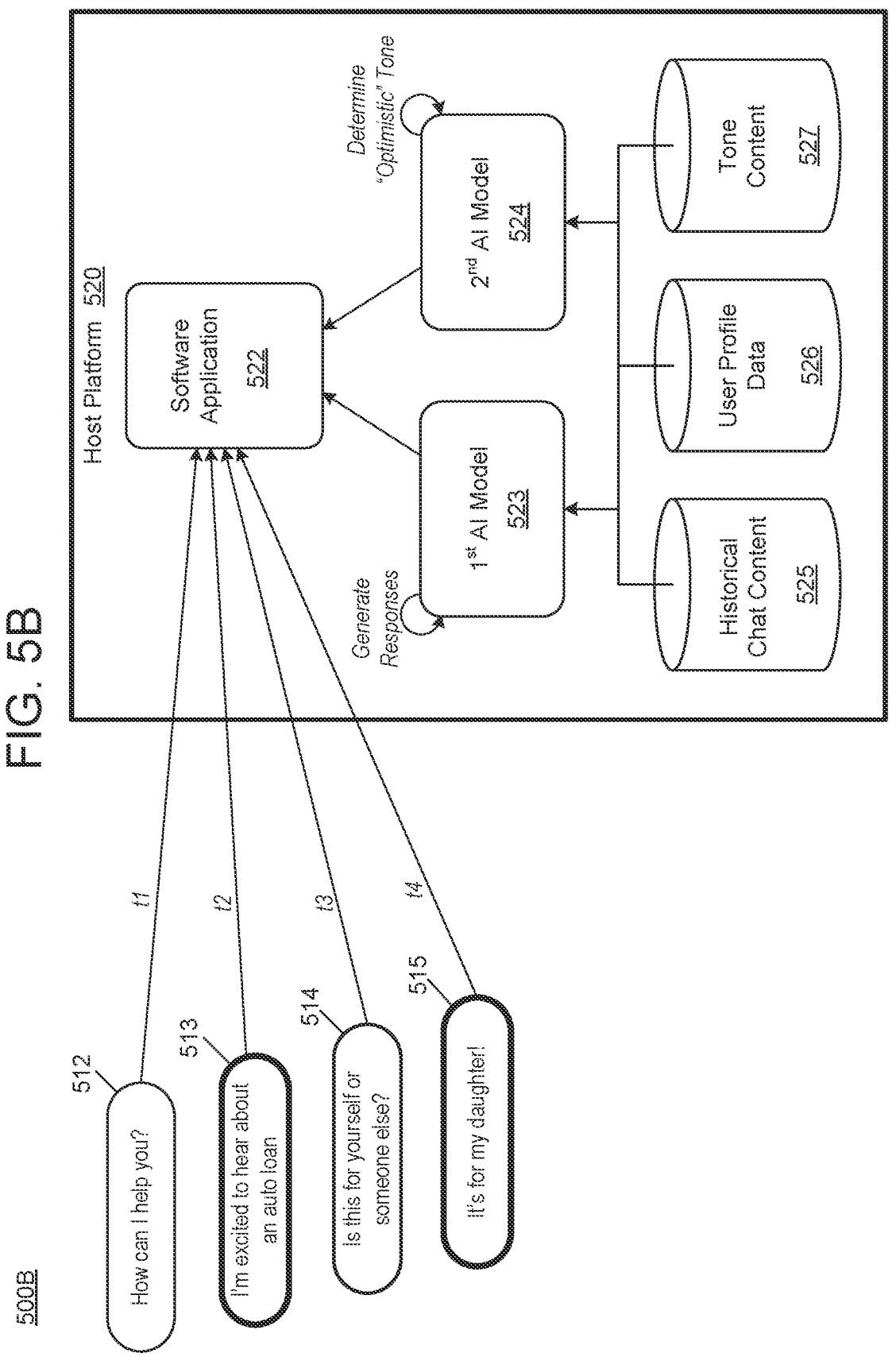
Figure 5C:
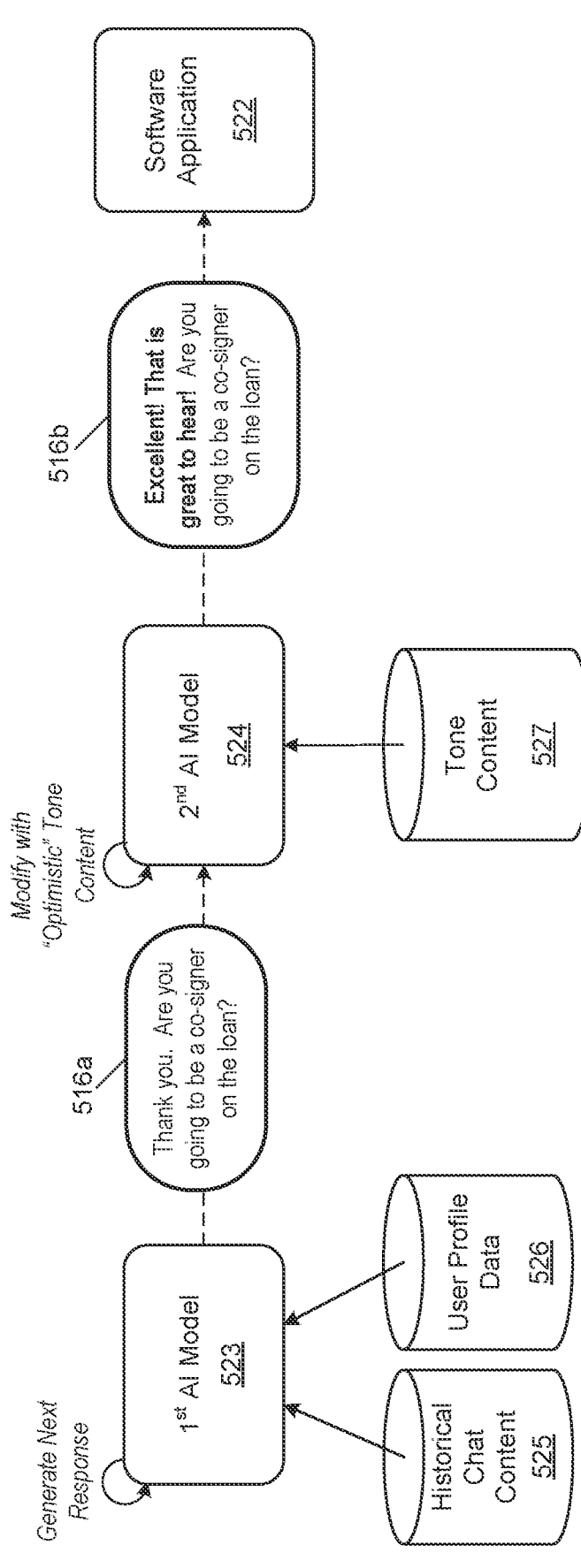

FIGS. 5A-5C illustrate a process of generating a chat response based on a tone of a conversation according to example embodiments. For example, FIG. 5A illustrates a view 500A of a chat conversation based on tone within a chat window 511 of a user interface of a user device 510, and FIG. 5B illustrates a process 500B of a software application 522 conducting the chat conversation with the user based on tone. In this example, the chat conversation is between a chatbot and a user of the user device 510. The user device 510 may be connected to a host platform 520 of the software application 522 over a computer network. Here, the chatbot may output chat responses generated by a first AI model 523 (shown in FIG. 5B) of the software application 522. The first AI model 523 may generate the chat responses based on the chat conversation within the chat window 511, historical chat content stored in a data store 525, user profile data stored in a data store 526, and the like. For example, a state of the chat conversation, the historical chat content, and the user profile data may be input during the live execution of the first AI model 523. As another example, the state of the chat conversation, the historical chat content, and the user profile data may be used to train the first AI model 523 before live execution.

In this example, the chat conversation includes an opening phrase 512 output by the chatbot within the chat window 511. The opening phrase 512 includes an introductory message that invites the user to provide more information. In response, the user inputs a message 513, which indicates interest in learning about a loan for a new auto. In response, the chatbot outputs a chat response 514, which requests even more information from the user about the potential loan of interest. In response, the user submits a message 515 which includes additional information about the loan input by the user.

According to various embodiments, each time the user submits a chat response within the chat window 511, a second AI model 524 (shown in FIG. 5B) may determine a tone of the chat conversation with the user based on a state of the conversational content within the chat window 511. In this example, the second AI model 524 may be trained based on historical conversations labeled with tone. The historical conversations with tonal content may be stored within a data store 527 and input during live execution of the second AI model 524 and/or used during training of the second AI model 524. In the example of FIG. 5B, the second AI model 524 determines the tone of the chat conversation is an "optimistic" tone based on the content included in the message 513 and the message 515 submitted by the user.

According to various embodiments, the software application 522 may use both the first AI model 523 and the second AI model 524 to generate chatbot responses. For example, the first AI model 523 may continue to generate chatbot responses based on the conversation state and the second AI model 524 may modify or otherwise rewrite the chat responses based on the tone determined from the conversation state. In the example of FIG. 5A, the chatbot outputs a chat response 516 which contains optimistic terms that have been ingested from the tone content data store 527. In response, the user submits an additional input message 517. In this case, the additional input message 517 by the user may or may not contain the same tone. Regardless, the software application 522 may continue to output chatbot responses based on the determined tone until the tone of the user changes. In this example, the software application 522 uses the first AI model 523 and the second AI model 524 to generate another chatbot response 518 with an optimistic tone. Integrating tone into a chat conversation makes the user experience more realistic, as if conversing with an actual human instead of a chatbot.

FIG. 5C illustrates an example of a process 500C of generating the chat response 516 (shown in FIG. 5A) based on the tone of the chat conversation. Referring to FIG. 5C, the first AI model 523 may ingest the current conversational state from the chat window and additional data such as historical chat content, user profile data, etc., and generate an initial chat response 516a. Meanwhile, the second AI model 524 may also ingest the conversational state and tone words/phrases from the tone content data store 527 and modify the initial chat response 516a to include tone. In the example of FIG. 5C, the second AI model 524 deletes initial content from the initial chat response 516a and replaces it with tone-based content, which includes optimistic phrases, to generate a tone-based chat response 516b. The tone-based chat response 516b may be output to the chat window by the software application 522.

In one embodiment, the system leverages an AI model to detect the tone of a chatbot conversation and respond with an appropriate tone. The AI model is a tone detector and an emotional intelligence interpreter. It understands and responds to various human emotions, such as frustration, joy, confusion, and disappointment. The model uses a vast dataset of customer service interactions, encompassing various industries and demographics. The training includes voice and text data annotated for emotional content, allowing the AI model to recognize subtle cues in language, syntax, and even speech patterns that indicate a user's emotional state. When customers interact with the chatbot, the AI analyzes their text or speech for emotional indicators. For example, word choice, sentence length, and punctuation might indicate frustration, while exclamation marks and positive language might suggest satisfaction or happiness. The model also uses the context of the conversation—a complaint, a query, or feedback—to understand the underlying emotion better. Once an emotion is identified, the AI model tailors its response accordingly. For a frustrated customer, the chatbot might respond with empathetic and reassuring language, acknowledging the customer's feelings, and offering specific solutions. For a satisfied customer, it might respond with congratulatory language or suggestions for further engagement. The system includes a feedback loop. After the interaction, customers are optionally asked to rate their experience. The feedback is used to train and refine the AI model continuously, improving its emotional intelligence and response accuracy. The AI also has a self-regulating mechanism to prevent misinterpretation. If the AI is uncertain about an emotional context, it escalates the interaction to a human agent, ensuring that complex emotional nuances are handled appropriately.

In one embodiment, the system uses an AI chatbot trained to recognize and respond in multiple languages while maintaining the appropriate cultural tone. The system is built upon a robust multilingual AI model. The model is trained on a diverse dataset comprising various languages and dialects from various global interactions. The interactions include customer service dialogues, social media exchanges, and professional communication from different cultures. Crucially, the training data is not just linguistically diverse; it also has cultural context and emotional tone annotations, allowing the AI to grasp the subtleties of polite conversation, formality levels, and cultural idioms that vary significantly across languages. When a customer interacts with the chatbot in a specific language, the AI first accurately identifies the language and then employs its culturally tailored communication strategy. For instance, in Japanese, the chatbot might adopt a more formal and respectful tone, consistent with the cultural norms of Japan. Conversely, the chatbot might use a more direct and informal tone in a casual business context in the United States. The system includes a dynamic tone adjustment feature. As the conversation progresses, the AI model continually assesses the customer's language style and adjusts its responses accordingly. The AI model follows suit if the customer's tone becomes more formal or informal, creating a more natural and comfortable interaction. Additionally, the system can handle idiomatic expressions and regional dialects, which are often challenging for standard translation services. The AI model's deep learning algorithms enable it to understand and appropriately respond to such language peculiarities, thereby avoiding misunderstandings that may arise from literal translations. The adaptive AI model benefits global corporations, e-commerce platforms, and businesses with diverse customer bases. It eliminates language barriers, fosters better customer relationships, and significantly enhances user satisfaction. Moreover, it simplifies operational logistics by reducing the need for multilingual staff while ensuring effective communication across different markets. The system includes a feedback mechanism where customer responses are analyzed post-interaction further to refine the AI model's language and tone understanding. This continuous learning process ensures that the AI model remains up to date with evolving language usage and cultural trends.

In one embodiment, the system uses an AI chatbot trained in patient-doctor conversations and tone to predict health concerns and questions and respond accordingly. The model is trained extensively with healthcare-specific dialogues, including patient-doctor interactions, inquiries, and various health-related discussions. The training data encompasses different medical scenarios, patient emotional states, and healthcare terminologies. This comprehensive dataset allows the AI model to understand the medical content of the conversations and the emotional undertones, such as anxiety, curiosity, or urgency, which are common in healthcare settings. When a patient initiates a conversation with the chatbot, the AI model analyzes the input for medical content and emotional cues. For instance, a patient expressing concern about specific symptoms is met with a response that addresses their medical query and acknowledges their worry. Through its predictive capabilities, the AI model anticipates follow-up questions and concerns based on the initial inquiry and provides comprehensive information accordingly. This includes explaining possible conditions, next steps, and reassurances to alleviate anxiety. The system integrates with patient health records and history (subject to privacy regulations and consent). By accessing this information, the AI model can tailor its responses more accurately, considering the patient's medical background, ongoing treatments, and past concerns. For example, the AI model may provide more detailed and specific advice or reminders about medication or upcoming appointments for a patient with a history of a particular condition. The AI model also supports continuous learning. Each interaction is analyzed to improve the AI model's understanding of patient communication patterns, medical queries, and effective response strategies, ensuring that the AI model remains current with medical advancements and changes in patient communication preferences. The system serves as the first point of contact for patients seeking medical information, providing immediate, personalized, and empathetic responses, improving the patient experience and engagement, and reducing the workload on healthcare professionals by handling routine inquiries and providing pre-consultation information.

In one embodiment, the system leverages an AI model trained to assist students in an educational setting. The system detects the student's tone—confusion, curiosity, or confidence—and adjusts its teaching style and explanations accordingly. For instance, a student struggling with a concept might receive a more detailed, step-by-step explanation in a supportive tone. In contrast, a more confident student might receive challenging questions to stimulate deeper learning. The AI model in this embodiment is meticulously trained with various educational dialogues and materials, ranging from textbook content to real-world teacher-student interactions. The training encompasses various academic subjects, educational levels, and learning styles. The model is also trained to recognize and interpret students' different emotional states and learning attitudes, such as confusion, curiosity, enthusiasm, or frustration, as expressed in their queries or responses. When a student interacts with the chatbot, the system analyzes the student's input for educational content and emotional tone. For instance, a student struggling with a complex mathematical problem might express frustration or confusion. The system recognizes these cues and responds with a simplified explanation or breaks down the problem into more manageable steps, all conveyed in a supportive and encouraging tone. The system adapts its teaching methods based on the student's responses. If a student demonstrates quick comprehension, the AI model might adopt a more challenging approach, presenting advanced problems or thought-provoking questions. Conversely, if a student is having difficulty, the AI model adopts a more patient and reassuring tone, providing detailed explanations, and encouraging the student to ask questions. The system personalizes learning experiences by referencing students' previous interactions and progress. It tracks the student's learning journey, identifies strengths and weaknesses, and tailors future interactions accordingly. For example, if a student consistently struggles with a particular concept, the AI tutor can provide additional resources or exercises explicitly targeting that area. Students can give feedback on their learning experience to continuously refine the AI model's teaching strategies and emotional intelligence capabilities, ensuring that the AI tutor remains effective and responsive to the evolving needs of students.

In one embodiment, the system leverages an AI model trained on online interactions to detect tone and mitigate online forum conflicts. The AI model is trained with a comprehensive dataset of online interactions, encompassing various topics, communication styles, and emotional tones. The training includes identifying conflict, aggression, and escalation patterns in online conversations. The AI model learns to recognize overtly aggressive language and subtler signs of conflicts, such as passive-aggressive remarks, sarcasm, and patterns of interaction that typically lead to heated exchanges. The AI model continuously monitors conversations when deployed in an online forum or social media platform. Upon detecting signs of potential conflict, the AI model intervenes in a manner designed to de-escalate tension. The intervention can automatically post neutral, calming messages or reminders of community guidelines. Additionally, it can directly message the involved parties, suggesting a cooldown period or offering ways to rephrase their points more constructively. The system adapts to the context and culture of the specific online community. Different forums have different norms; what might be considered a heated debate in one community may be everyday discourse in another. The AI model is tailored to understand and adapt to these varying community standards. The system learns and evolves based on feedback and ongoing interactions. As the AI model intervenes in conversations, it collects data on the effectiveness of different de-escalation strategies. The data is used to refine its conflict detection and resolution tactics, ensuring the AI model remains effective over time and across various conflicts.

In one embodiment, the system uses a chatbot integrated with an AI model trained to detect the tone of conversations and respond accordingly. The chatbot interface is hosted within a software application. The chatbot interacts with users via a chat window, providing a platform for exchanging messages. The primary function of the chatbot is to engage in conversations with users, where it receives user inputs as queries and generates responses. An AI model residing within the host platform is crucial in developing initial chatbot responses. The AI model operates by processing user queries received through the chat window. The AI model leverages various data sources, including historical chat content and user profile data stored in dedicated data stores, to generate contextually rich and accurate responses. The model understands the conversation's context, including the most recent user input and the overall conversation history, enabling it to provide coherent and contextually relevant responses. A second AI model is employed to determine the tone of the chat conversation. This AI model is trained on historical conversations labeled with different tones, such as optimism, humor, or pessimism. It analyzes the content within the chat window, including the current state of the conversation and the tone of the messages. Based on the analysis, the second AI model identifies the predominant tone of the user's messages and adjusts the chatbot's responses accordingly. When the first AI model generates a response, the second AI model evaluates the response for its tone. If the tone is deemed inconsistent or inadequate relative to the conversation's context, the second AI model modifies or rewrites the response to align it with the identified tone of the conversation. The system combines the outputs of multiple models to improve prediction accuracy and robustness. When the primary response generated by the first AI model is insufficient or unrelated, additional models are invoked to generate alternative responses based on the same user input. The best response is then selected, ensuring accuracy and relevance. If they deviate, the AI model can also steer conversations back to the main topic of interest. This is achieved by continuously monitoring the conversation and identifying deviations from the established topic. The AI model then generates responses that gently guide the conversation to the main topic, enhancing focus and efficiency.

A baseline professional tone model may be utilized in the instant solution to maintain an appropriate level of emotional response in the chatbot interactions. This model aims to ensure that while the chatbot mirrors the user's tone, it does not escalate its responses to a degree that might be deemed unprofessional or inappropriate. The baseline model defines what constitutes a "professional tone." This would involve establishing parameters for language use, emotional expression range, and response etiquette. For example, the model restricts overly casual language, avoids extreme expressions of emotions (like anger or overexcitement), and adheres to formal or semi-formal communication. The baseline professional tone model acts as a moderator or filter for the responses generated. After the AI model proposes a context-based response, and a second AI model adjusts it according to the detected user tone, the baseline model would review the final response. It ensures that the response, while reflective of the user's tone, remains within the bounds of professional decorum. The baseline model adjusts the tone of the chatbot's responses. For example, if a user expresses frustration, the chatbot might mirror a degree of concern or urgency in its response but will avoid matching any unprofessional aspects of the user's tone, like using aggressive language or overly negative sentiments.

In one embodiment, the baseline model, equipped with a feedback mechanism to learn and calibrate what is acceptable, analyzes the outcomes of different interactions to better understand what tone mirroring levels are effective and professionally acceptable. In scenarios where the user's tone becomes increasingly unprofessional or emotionally charged, the baseline model would prevent a similar escalation in the chatbot's responses. Instead, it guides the conversation back to a neutral, professional tone or even initiates protocols for handling highly charged situations, such as referring the user to a human representative, for example. The baseline model also aims to enhance the user experience by providing empathetic, relevant, and respectful responses, thus maintaining a balance between mirroring the user's tone and adhering to professional standards.

Figure 6A:
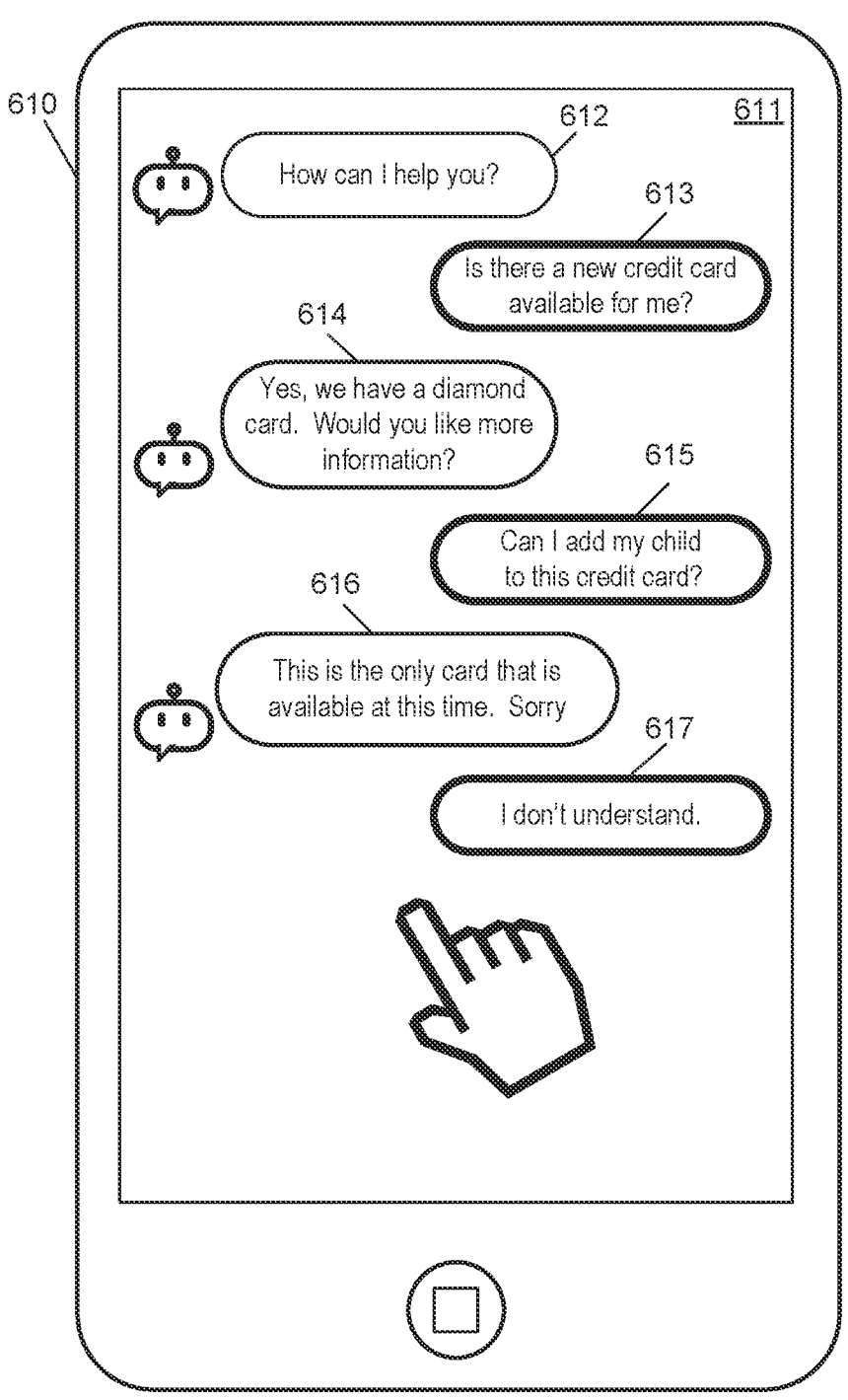

FIGS. 6A-6D illustrate a process of detecting an insufficient or an unrelated chatbot response and handling the insufficient or unrelated chat response with a secondary AI model according to example embodiments. For example, FIG. 6A illustrates a view 600A of a chat conversation within a chat window 611 of a user interface of a user device 610 and FIG. 6B illustrates a process 600B of a software application 622 conducting the chat conversation with the user. In this example, the chat conversation is between a chatbot and a user of the user device 610. The user device 610 may be connected to a host platform 620 of the software application 622 over a computer network. According to various embodiments, the chat conversation may include chat responses from a chatbot generated by a first AI model 623 (shown in FIG. 6B) of the software application 622. The first AI model 623 may generate chat responses based on the chat conversation within the chat window 611, historical chat content stored in a data store 625, user profile data stored in a data store 626, and the like. For example, a state of the chat conversation with the user, the historical chat content, and the user profile data may be input during live execution of the first AI model 623. As another example, the state of the chat conversation with the user, the historical chat content, the user profile data, and the like, may be used to train the first AI model 623 before live execution.

According to various embodiments, the first AI model 623 may also be configured to determine whether a chatbot response generated by the first AI model 623 has not sufficiently addressed the conversation with the user. Referring to FIG. 6A, the chat conversation includes an opening phrase 612 output by the chatbot within the chat window 611. The opening phrase 612 includes an introductory message which invites the user to provide more information. In response, the user inputs a message 613, which indicates interest in learning about a new credit card. In response, the chatbot outputs a chat response 614 which identifies an available credit card and offers to provide more information. In response, the user submits a message 615 with an additional query about the credit card. In response, the first AI model 623 generates a chat response 616 that creates confusion for the user. This process may cause the chat conversation to become a death spiral that creates a sequence of confusing and/or unhelpful responses, eventually losing the user's interest.

To prevent this "death spiral," the first AI model 623 may receive the state of the conversation after each communication between the chatbot and the user. In this example, the user submits a message 617 in FIG. 6A, which indicates confusion. For example, as shown in FIG. 6B, the first AI model 623 may receive the state of the conversation after each message and determine whether the conversation has reached an unnatural state, for example, based on a lack of response from the user, a question from the user, a repeated query from the user, or the like. In FIG. 6B, the first AI model 623 may detect that the chat response 616 output by the chatbot within the chat window 611 is an insufficient or unrelated response based on the confusion included in the message 617 submitted by the user. For example, the first AI model 623 may be trained to identify when a chat conversation has created confusion, disinterest, anger, etc., and intuitively stop conversing with the user. That is, rather than continue to try to fix the problem, the first AI model 623 may submit the state of the conversation to one or more additional AI models.

Figure 6C:
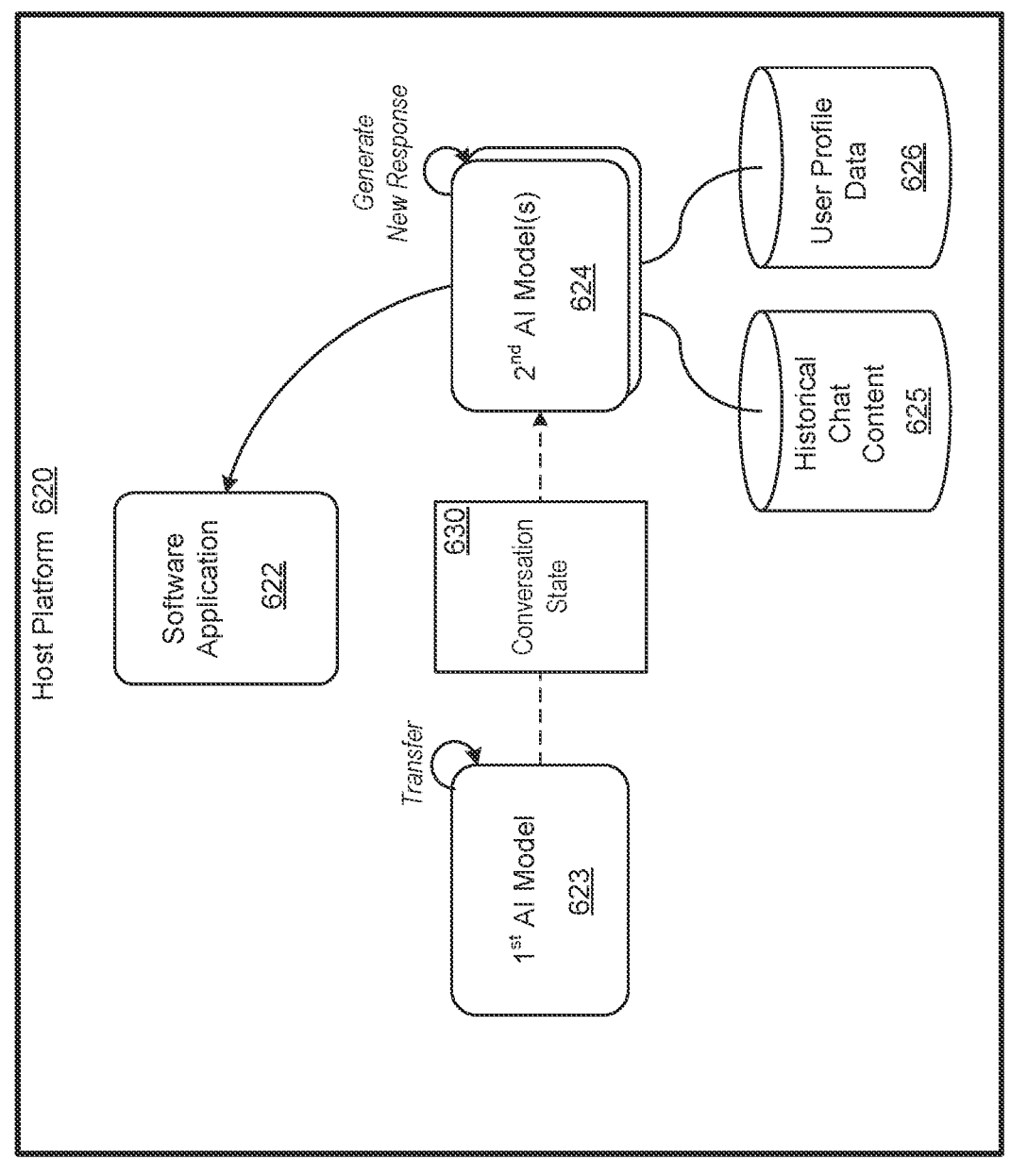
Figure 6D:
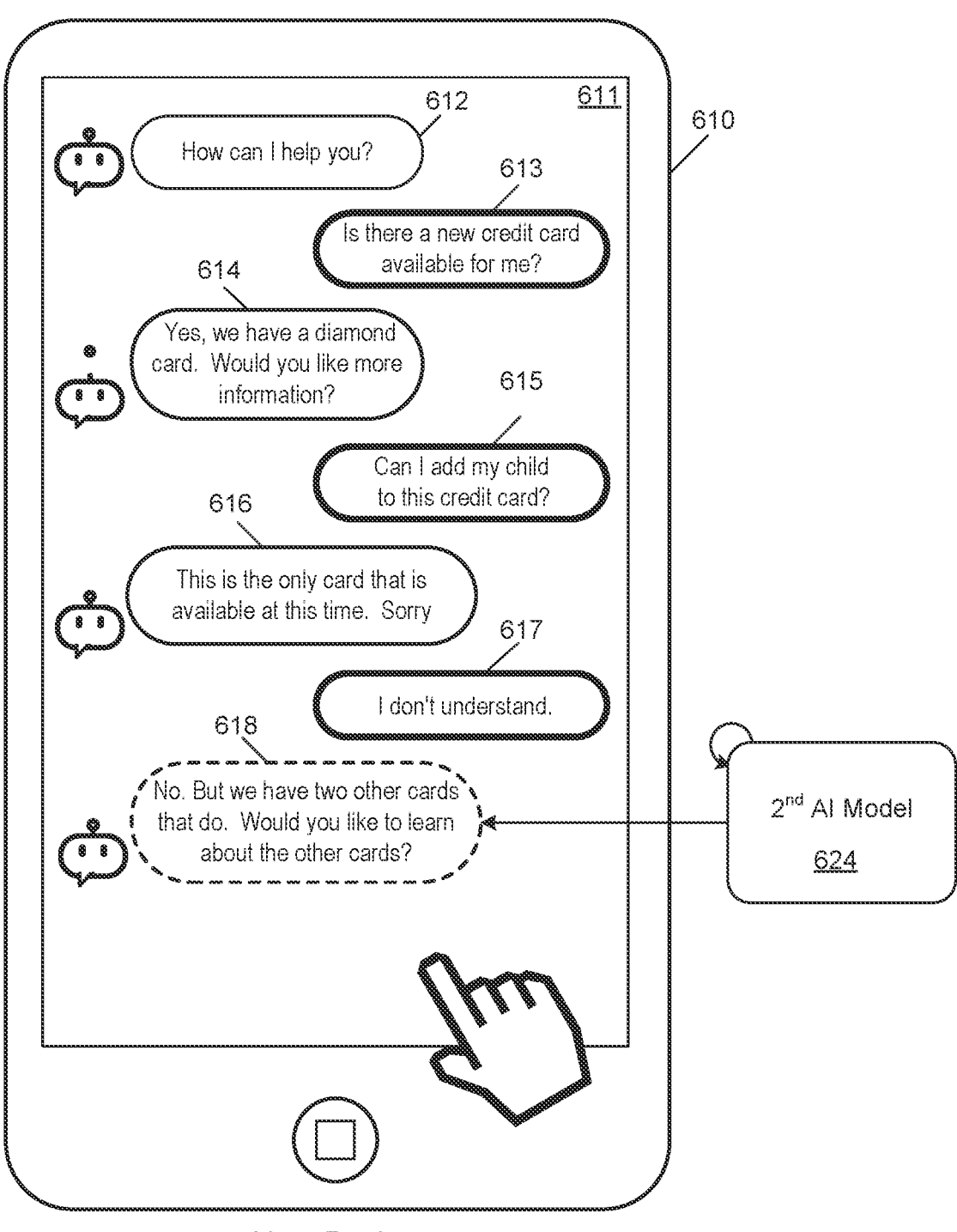

For example, FIG. 6C illustrates a process 600C of triggering one or more additional AI models, including a second AI model 624 to generate a new chat response based on the state of the conversation between the conversation output by the first AI model 623 and the user. In this example, the first AI model 623 (or the software application 622, etc.) may transfer a conversation state 630 to the second AI model 624. The state of the conversation may include the chat messages that were output before the insufficient response (the chat response 616), which includes the opening phrase 612, the message 613, the chat response 614, and the message 615. In response, the second AI model 624 may generate a new chatbot response 618 (shown in process 600D in FIG. 6D) which is then output to the chat window 611 by the software application 622.

Here, the new chatbot response 618 is displayed in sequence with the messages generated by the first AI model 623 therefore continuing the flow of the conversation with the user without interrupting the user's interest. The second AI model 624 may generate a different response than the first AI model 623 due to different input data, different training data, a different algorithm, or the like, which cause the second AI model 624 to generate a different output. As an example, the second AI model 624 may include the same algorithm as the first AI model 623 but may be trained on different training data. As another example, the second AI model 624 may include a different algorithm than the first AI model 623. In this case, the second AI model 624 may be trained on the same training data, common training data, or different training data as the first AI model 623.

In one embodiment, the system integrates an AI model into e-learning platforms. The system employs a two-tiered AI model approach to analyze student-chatbot interactions, focusing on identifying emotional cues such as frustration, confusion, or disengagement in students' text responses during the learning process. The first AI model is a sophisticated emotion detection system trained on a diverse dataset of student chatbot interactions. The dataset includes various indicators of emotional states, such as language patterns, response time, and query repetition. The model recognizes subtle signs of emotional responses, such as frustration from repeated queries on a single topic or confusion indicated by vague or off-topic responses. The system activates a second AI model by detecting an emotional cue that suggests the educational content might not be clear or engaging enough. The second model is specifically trained to tailor educational content based on the identified emotional state. For instance, if confusion is detected, the model might simplify the explanations, provide additional examples, or suggest alternative learning resources like videos or interactive modules. In cases of frustration, it offers motivational messages or more accessible subtopics to help regain the student's confidence. As students interact with the system, it continually adapts, providing content that matches their academic level and their current emotional state. The dynamic adjustment helps maintain engagement, improves comprehension, and accelerates learning. Additionally, the system collects data on points where students commonly experience difficulties, which can be invaluable for educators. This feedback enables course creators to refine and improve the course material, making it more effective for future learners. The system integrates with existing e-learning platforms, requiring minimal adjustments to the current infrastructure. It operates in the background, ensuring a non-intrusive yet effective enhancement of the learning process.

In one embodiment, the system uses an AI model for healthcare-patient interaction and support. The core of the system is an AI model trained on a vast array of patient-doctor and patient-nurse chatbot conversations. The model analyzes text-based interactions, identifying instances where patients' queries about symptoms, treatments, or medication are not sufficiently addressed. It looks for repeated questions, usage of uncertain terms, or follow-up questions that suggest the initial response did not fully resolve the patient's concerns or queries. When the primary AI model detects an insufficient response or an unrelated response to the chat conversation with the patient, it activates a secondary AI model. This model is distinctively trained with extensive medical knowledge, including information on diseases, medications, treatment protocols, and patient care guidelines. It generates a more comprehensive, informative, and understandable response. This can involve offering a more detailed explanation of a medical condition, suggesting steps for care, or advising on medication usage in a manner that is tailored to the patient's level of understanding. The system personalizes responses based on the patient's medical history and profile from electronic health records, ensuring that the information provided is relevant to the individual's specific health circumstances. The system integrates with existing healthcare ecosystems, including electronic health record systems, patient management systems, and telehealth platforms. The integration allows for seamless access to patient data, enabling more accurate and personalized responses. The system improves the patient's understanding of their health conditions and treatments. The AI models are trained on diverse datasets and can continuously learn. They evolve, incorporating new medical knowledge and adapting to emerging healthcare trends.

In one embodiment, the system utilizes AI to enhance business customer feedback analysis. The system employs a sophisticated two-tier AI model to enhance customer service strategies and responses, ultimately boosting customer satisfaction and brand loyalty. The primary AI model is trained on customer service interactions, detecting when customer feedback or complaints are not sufficiently addressed. The model searches for patterns indicating dissatisfaction, such as repeated complaints, unresolved issues, or negative sentiment expressed in customer feedback. When such instances are identified, a secondary AI model, trained on a vast database of customer service resolutions and best practices, suggests alternative approaches or responses. This model is enriched with an extensive database of successful customer service resolutions, best practices, and strategies. Its primary function is to analyze the specific context of the customer feedback and suggest alternative approaches or responses. For example, it might recommend different wording for a response, suggest additional compensation or solutions to the customer's issue, or even propose changes to company policies that are repeatedly causing dissatisfaction. The system analyzes trends and patterns in customer feedback to identify areas where services or products need improvement. The AI model integrates with existing customer relationship management (CRM) systems to ensure that the tool can analyze and improve customer interactions across various platforms, including email, chat, social media, and phone. The system works in real-time, providing immediate suggestions during live customer interactions and as a post-interaction analysis tool, offering insights and improvement suggestions after the interaction. The AI models adapt over time and continuously update their knowledge base with new customer service trends, feedback patterns, and resolution strategies.

In one embodiment, the system integrates an AI model into an existing Interactive Voice Response (IVR) system. The AI model is trained explicitly on voice interactions in customer service settings. The model analyzes spoken customer queries and responses from the IVR system. It focuses on detecting instances where the customer's query is not adequately addressed, in which repeated questions may indicate requests to speak to a human agent or signs of frustration in the customer's tone or choice of words. When the primary AI model detects an insufficient response or an unsatisfactory customer interaction, it triggers a secondary, more sophisticated AI model. This model, equipped with advanced natural language processing and understanding capabilities, provides more nuanced and contextually appropriate solutions. Unlike traditional IVR systems that follow a fixed script, this AI model dynamically generates responses based on the specific nature of the customer's query, ensuring a more personalized and effective resolution. The system improves the customer experience by reducing the time and effort required to resolve queries. It understands complex requests, provides detailed information, and performs specific tasks like scheduling appointments and processing payments, which traditional IVR systems might handle inadequately. The AI-enhanced IVR system integrates seamlessly with existing call center technology, allowing for minimal service disruption. Both AI models learn continuously from interaction, becoming more efficient at understanding customer needs and generating appropriate responses.

In one embodiment, the system uses an AI model to monitor and analyze interactions on social media platforms. The AI model is trained on a vast array of social media interactions, including comments, posts, and direct messages. The model specializes in scrutinizing these interactions to identify instances where responses from automated accounts, such as chatbots or official brand accounts, have not been adequately addressed. It looks for patterns indicating dissatisfaction, miscommunication, or negative sentiment, such as repeated complaints, unresolved queries, or escalating frustration in follow-up interactions. The AI model is trained to identify instances where responses from automated accounts (like chatbots or official brand accounts) are insufficient or poorly received by users. Upon detection, a second AI model, trained in public relations and social media engagement strategies, generates alternative responses, or suggests interventions. This model, enriched with knowledge of public relations and social media engagement strategies, generates alternative responses, or offers interventions. For example, it might recommend a more empathetic tone, provide more detailed information, or suggest escalating the issue to a human agent for a personalized touch. The system ensures that social media interactions are handled effectively, preventing potential public relations crises, and fostering a more positive perception of the brand among its audience. The AI model integrates with existing social media management tools, allowing brands to utilize their current platforms while enhancing their interaction capabilities. The system operates in real-time, providing immediate suggestions during live interactions, and can also analyze past interactions to offer insights for future communication strategies. The AI models learn and adapt over time, continuously updating their knowledge base with new social media trends and communication patterns.

In one embodiment, the system integrates multiple AI models within a host platform to enhance chatbot interactions. The system is designed to address conventional chatbots' limitations in handling complex queries and maintaining a consistent conversational tone. The primary AI model generates initial chatbot responses to user queries. The responses are formulated based on recent user input and conversation histories, allowing the model to produce more contextually relevant and coherent responses. The secondary AI model assesses the tone of the ongoing conversation between the user and the chatbot. The tone can encompass a range of emotional and conversational cues such as optimism, humor, formality, or assertiveness. Once the tone is identified, the second AI model modifies the responses generated by the primary AI model, ensuring the tone of the conversation remains consistent and appropriate. The interaction between the AI models and the user occurs through a user interface installed on the user's device, potentially a mobile application or a progressive web application. The system includes a mechanism to identify when the chatbot, powered by the primary AI model, fails to provide a related or sufficient response to a user query. In such cases, the secondary AI model generates a new response to more effectively address the user's needs. The AI models are trained using diverse data sources, including previous chat conversations, user data, and content from various external sources.

Users of a chat conversation can be unpredictable and may deviate from the topic. In such cases, the state of the conversation input to the AI model may cause the AI model to create insufficient or unrelated responses. To prevent such a problem, the AI model described herein may use a topic of interest maintained throughout the chat conversation. FIGS. 7A-7E illustrate a process of guiding a chat conversation back to a topic of interest according to example embodiments.

In one embodiment, human pretense is lowered using a corrective generated response to ensure that the user is reminded that they are talking to an AI Chatbot and not a human to steer back to the topic. This strategy is designed to remind users that they are interacting with an AI Chatbot and not a human being. The objective is to guide the conversation back to the relevant topic, especially in situations where the user might start treating the chatbot as a human conversational partner, potentially leading to unrealistic expectations or off-topic digressions. The corrective generated response incorporates elements that are unmistakably characteristic of AI communication, such as referencing its nature as a software program or using language patterns that are algorithmic and not human-like. This is done in a manner that is not abrupt or jarring but serves as a gentle nudge to realign the user's perception of the interaction. By doing so, it resets the user's expectation and focus, guiding them back to the task or topic at hand. This method balances maintaining user engagement and providing effective assistance while ensuring clear communication boundaries are set regarding the nature of the chatbot as an AI entity.

Figure 7A:
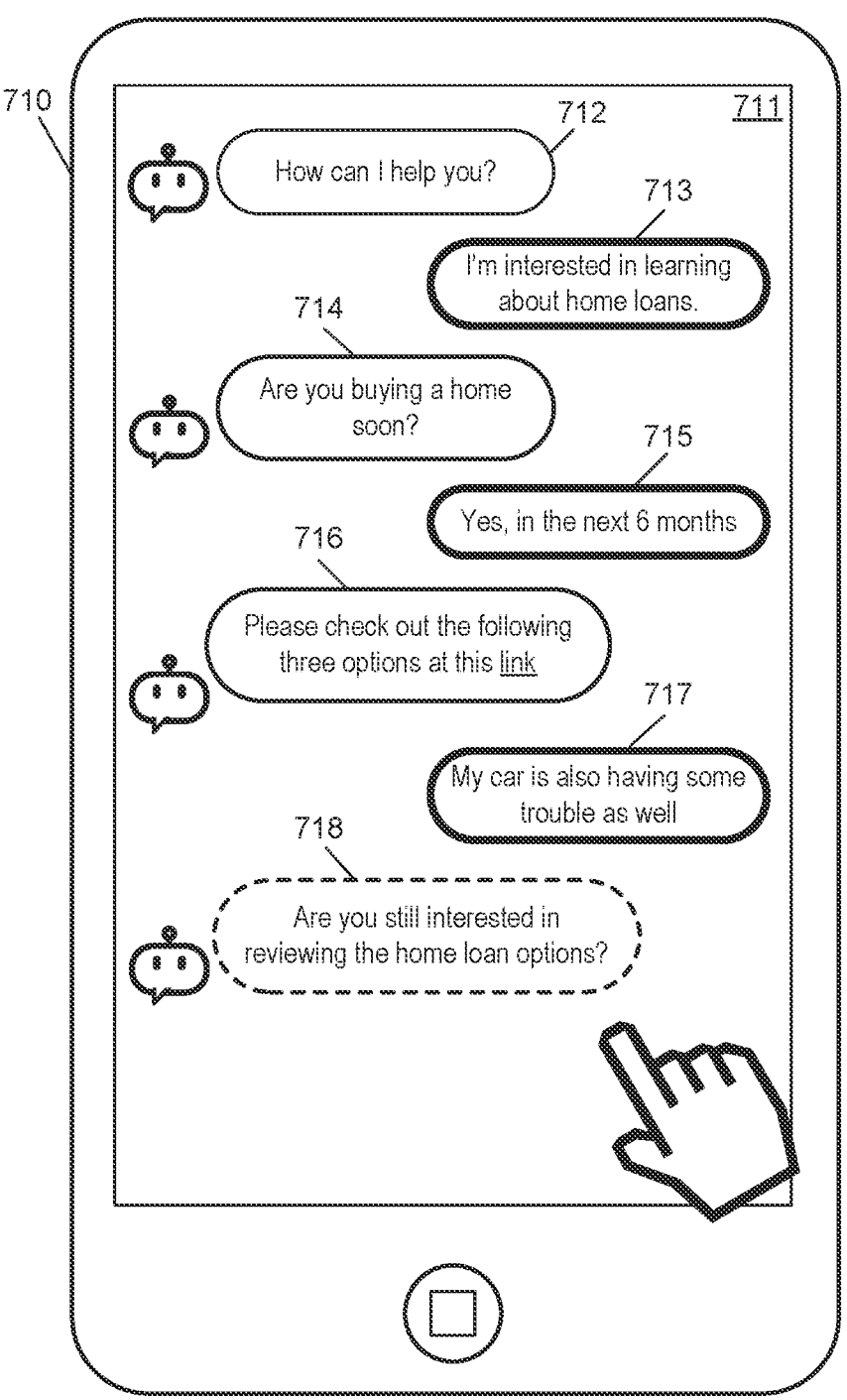
FIGS. 7A-7E are diagrams illustrating a process of guiding a chat conversation back to a topic of interest according to example embodiments.
Figure 7B:
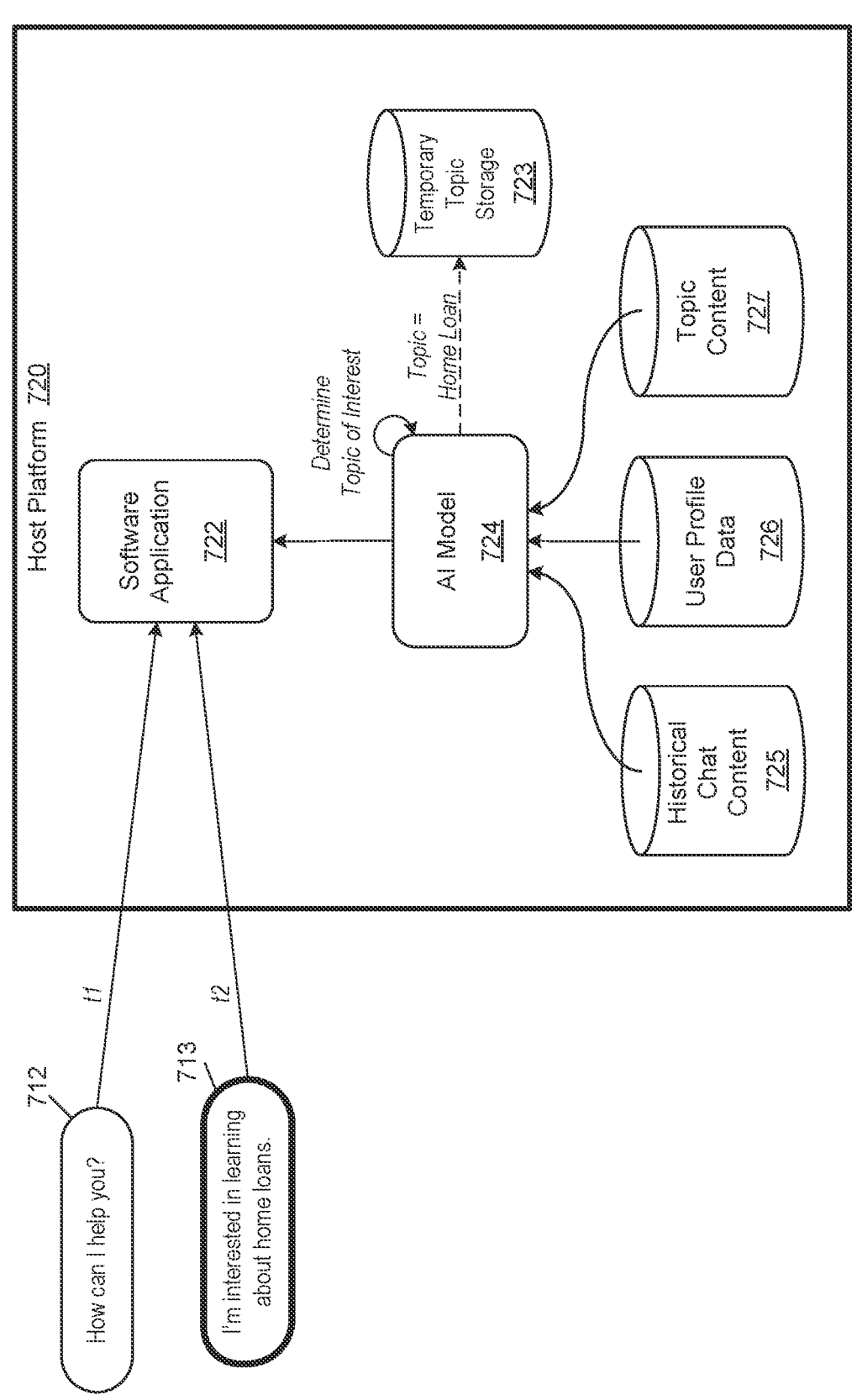
Figure 7C:
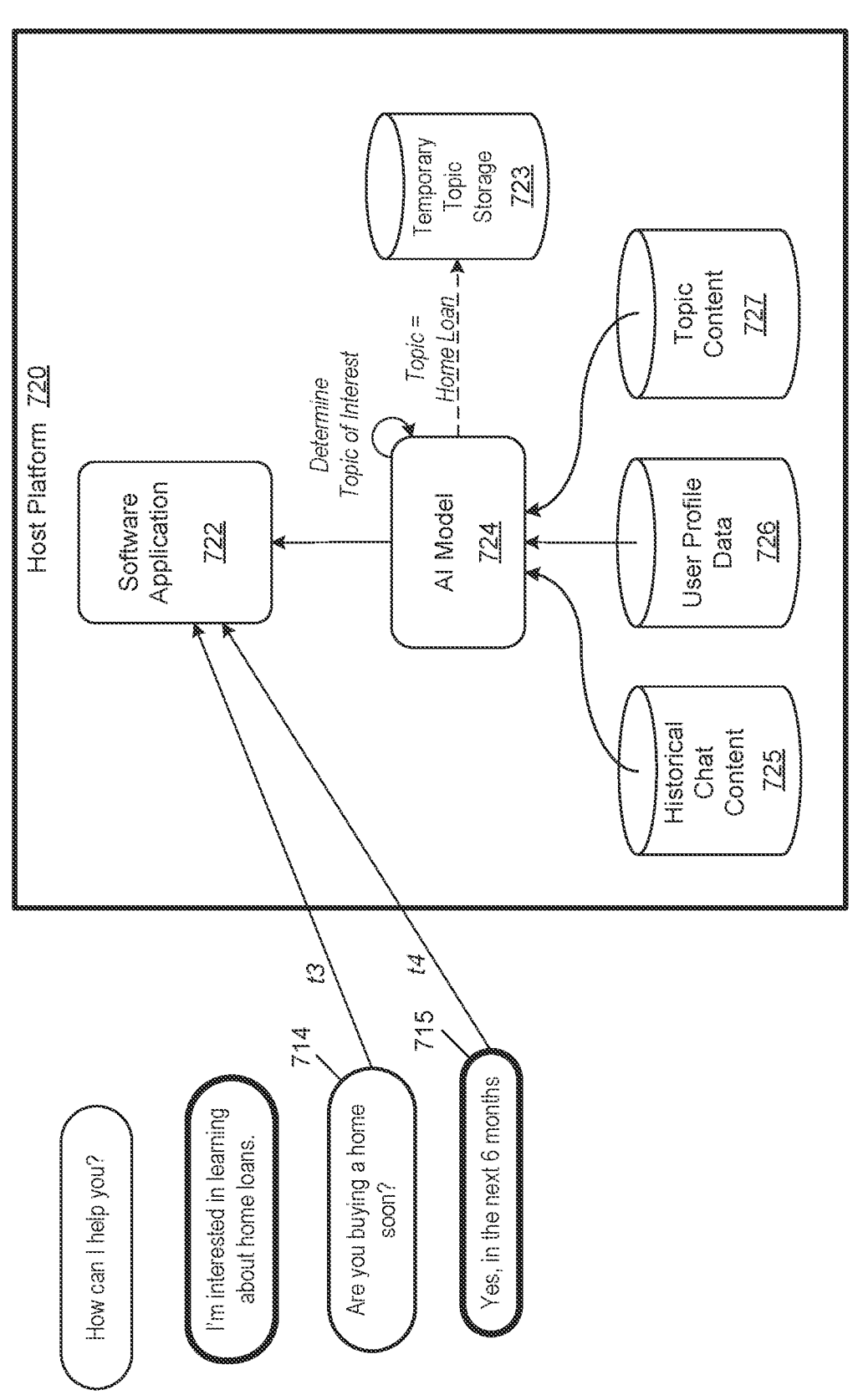
Figure 7D:
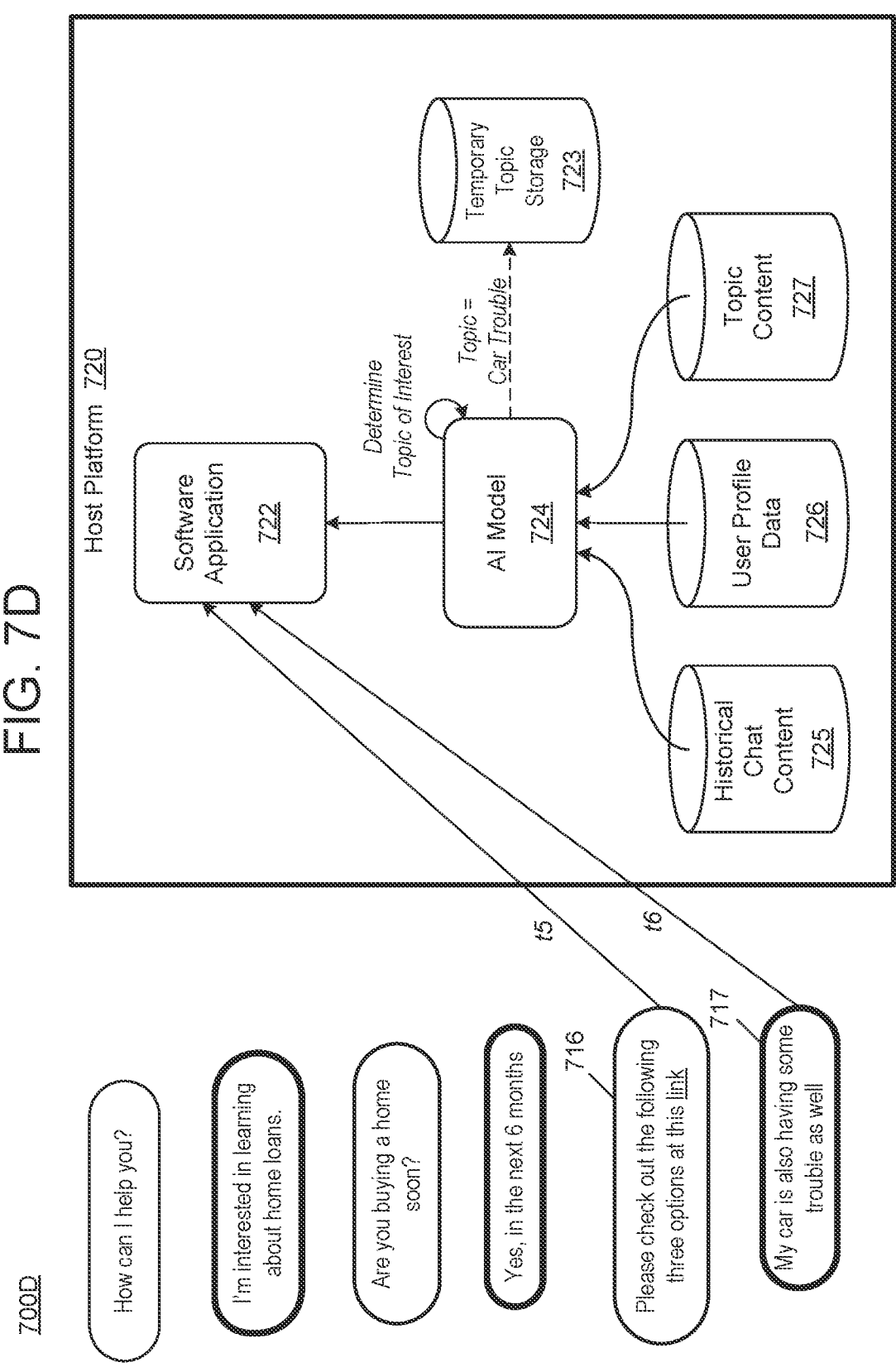
Figure 7E:
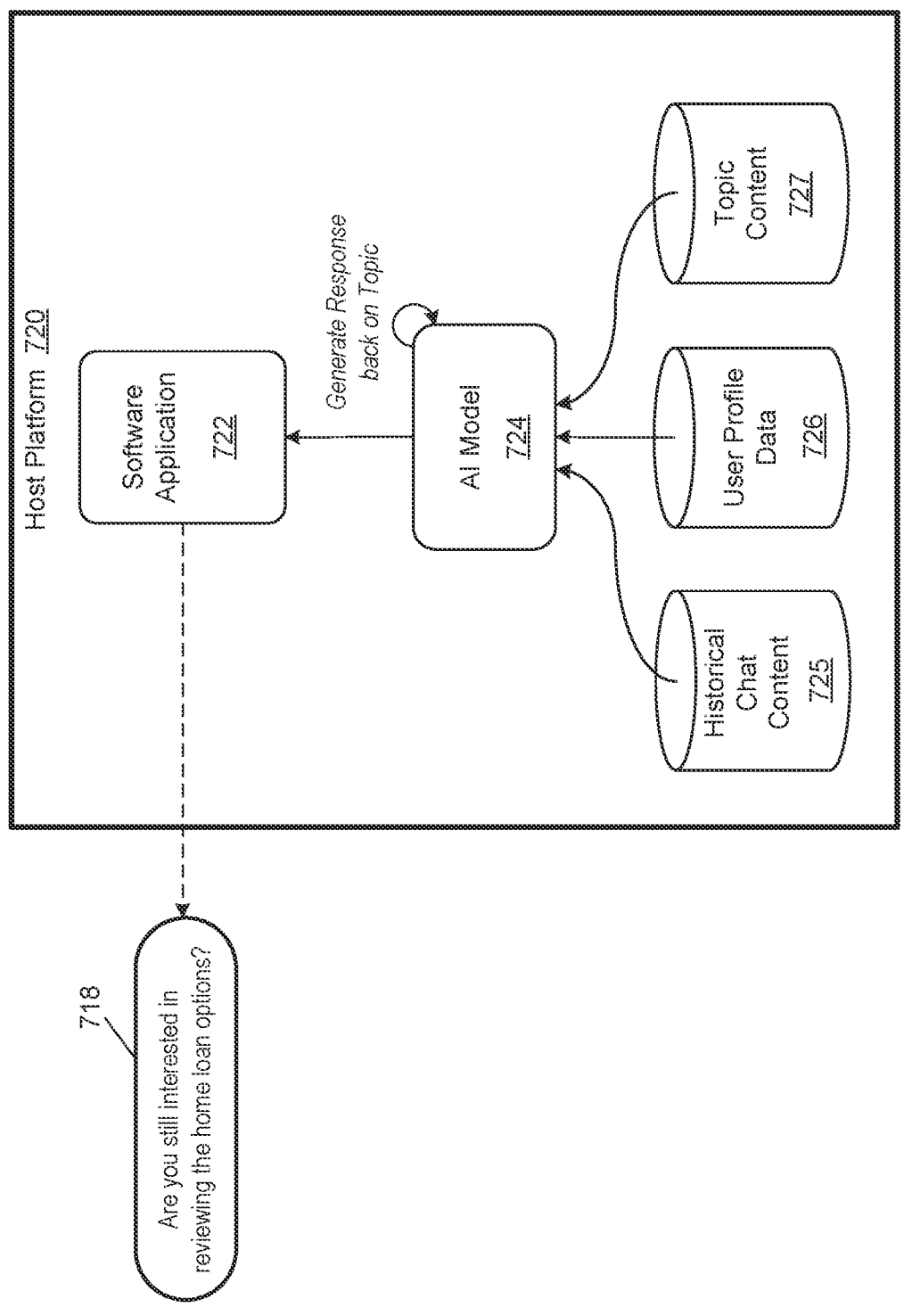

For example, FIG. 7A illustrates a view 700A of a chat conversation within a chat window 711 of a user interface of a user device 710. FIGS. 7B-7D illustrate an iterative process of analyzing a chat conversation for a topic of interest, and FIG. 7E illustrates a process of guiding a user back to the topic of interest. In these examples, the chat conversation is between a chatbot and a user of the user device 710. According to various embodiments, the chat conversation may include chat responses from a chatbot generated by an AI model 724 (shown in FIG. 7B) of a software application 722. The AI model 724 may generate chat responses based on the chat conversation within the chat window 711, historical chat content stored in a data store 725, user profile data stored in a data store 726, topic content stored in a data store 727, and the like. For example, a state of the chat conversation with the user, the historical chat content, the user profile data, topic content, and the like, may be input during live execution of the AI model 724. As another example, the state of the chat conversation with the user, the historical chat content, the user profile data, topic content, and the like, may be used to train the AI model 724 before live execution.

Referring to FIG. 7A, the chat conversation includes an opening phrase 712 output by the chatbot within the chat window 711. The opening phrase 712 includes an introductory message which invites the user to provide more information. In response, the user inputs a message 713 which indicates interest in learning about a home loan. In response, the chatbot outputs a chat response 714, which requests additional information about a timing of the home loan. In response, the user submits a message 715 with additional data input by the user in response to the request from the model. In response, the AI model 724 generates a chat response 716 which provides a clickable link to view three home loan products. However, rather than click on the link, the user submits a message 717, which is unrelated to the home loan. In response, the AI model 724 may generate a new chat response 718 which attempts to guide the conversation back to the original topic of interest.

According to various embodiments, the AI model 724 may be trained to generate chat responses and determine a topic of interest in a chat conversation. For example, FIG. 7B illustrates a process 700B of the AI model 724 determining a topic of interest. In this example, the AI model 724 is hosted by a host platform 720 connected to a software application 722 that outputs the chat content to the user device 710. Here, the AI model 724 may receive an initial state (e.g., a first subset of communications) from the chat window 711 and determined a topic of interest of the conversation. The topic of interest may be stored within a temporary topic storage 723, which the AI model 724 can refer to for subsequent iterations of the conversation with the user. In this example, the AI model 724 determines that the topic of interest is a new home loan.

The topic evaluation performed by the AI model 724 may be iterative (e.g., performed after each round of communication between the chatbot and the user, etc.). For example, FIG. 7C illustrates a process 700C of determining a topic of interest of a next iteration of the chat conversation and comparing it to the original topic of interest determined in FIG. 7B. In this example, the AI model 724 receives the next round of communication (e.g., the chat response 714 and the message 715 input by the user) and determines a topic of interest for this round of communication. Again, the topic of interest is determined to be the home loan. The AI model 724 may compare the topic of interest to the original topic of interest of the conversation, which is stored in the temporary topic storage 723. If the topics match, the AI model 724 may generate a chat response that continues the conversation based on the topic of interest.

Meanwhile, FIG. 7D illustrates a process 700D determining a topic of interest of a next iteration of the chat conversation and comparing it to the original topic of interest determined in FIG. 7B. In this example, the AI model 724 receives the next round of communication (e.g., the chat response 716 and the message 717 input by the user) and determines a topic of interest for this round of communication. In this example, the topic of interest is car trouble. The AI model 724 may compare the topic of interest to the original topic of interest of the conversation, which is stored in the temporary topic storage 723. In this case, the topics do not match. According to various embodiments, the AI model 724 may generate the new chat response 718 (shown in process 700E in FIG. 7E), which attempts to guide the conversation back to the original topic of interest stored in the temporary topic storage 723. In doing so, the AI model 724 can keep the focus of the conversation on a particular topic which prevents deviated conversation data from being input to the AI model 724 and which may potentially complicate the conversation with the user because the model will be processing more topics.

In one embodiment, the system uses an AI model that recognizes the emotional context of a chatbot conversation. The system's AI model employs sophisticated natural language processing (NLP) algorithms and sentiment analysis techniques. These tools allow the AI to interpret the words the user uses and the underlying emotions they convey. For example, the system can distinguish between a user's frustration, confusion, satisfaction, or urgency. This emotional understanding is crucial in tailoring contextually relevant responses and empathetically aligned with the user's emotional state. The system has a dynamic response mechanism. When the AI model detects a shift in emotional tone—for instance, a user moving from a neutral to a frustrated state—it triggers a specific protocol. This can involve escalating the conversation to a human agent, especially when human empathy is crucial. The transition to a human agent is designed to be seamless, ensuring that the user does not have to repeat information and the agent is fully briefed on the conversation history and the user's emotional state. Furthermore, the system includes a feedback loop where user reactions to AI responses are continuously monitored and analyzed. This feedback is crucial for the AI model's learning process, enabling it to refine its emotional recognition capabilities. Over time, the system becomes more adept at understanding and responding to a wide range of emotional cues, improving the overall user experience.

In one embodiment, the system leverages an AI model to predict future chatbot topics. The AI model algorithm has advanced predictive analytics and machine learning capabilities. The system analyzes the current trajectory of the conversation, considering the user's query history, interaction patterns, and the context of the current interaction. The analysis identifies potential topics the user might be interested in or likely to inquire about next. For example, if a user inquires about a product, the system might predict that the next query may be related to products, pricing, or shipping details. The system draws insights from previous interactions with the individual user and a broader user base. The extensive data pool enables the AI model to recognize patterns and commonalities in user behavior and queries. The system also incorporates real-time data, such as trending topics or frequently asked questions, to stay updated and relevant. Upon predicting a potential future query, the AI model proactively provides relevant information, suggestions, and solutions. For instance, if a user is booking a flight, the chatbot might proactively offer information about travel insurance or seat selection options. Users can provide immediate feedback on the relevance and helpfulness of the proactive information, enabling the AI model to refine its predictions and become more accurate over time.

In one embodiment, the system can align multilingual conversations that depart from the topic. The system recognizes and adapts to language shifts within a conversation. The AI model uses advanced natural language processing and machine translation technologies to detect when a user switches languages during a chat interaction. For instance, the system seamlessly recognizes this change if a conversation starts in English and the user switches to Spanish. It continues the conversation in Spanish without losing the context or relevance of the discussion. Once a language shift is detected, the system employs a sophisticated machine translation module to ensure the conversation remains on-topic and coherent. The translation process is not just word-for-word but context-aware, considering idiomatic expressions, cultural nuances, and the specific domain of the conversation, ensuring that the translated responses are linguistically accurate and culturally and contextually appropriate. The system continuously improves its language recognition and translation capabilities through deep learning. The AI model is trained on a vast and diverse dataset of multilingual conversations, enabling it to understand various dialects, slang, and colloquialisms. The system realigns conversations that may inadvertently deviate from the topic due to language-related misunderstandings. If the conversation deviates from the original topic after a language switch, the AI model identifies the discrepancy and steers the conversation back to the main subject.

In one embodiment, the system leverages an AI model to provide real-time feedback for chatbot responses. The system includes a user-interactive feedback mechanism integrated into the chat interface. When a user interacts with the chatbot, they not only receive responses but also have the option to provide immediate feedback on the relevance and adequacy of each response. For example, after receiving a chatbot response, the user may indicate whether the reply was helpful, whether it adequately addressed their query, and if it stayed on the intended topic. Feedback is provided through simple interactive elements like buttons or sliders, ensuring ease of use. The AI model uses the feedback to adjust its response patterns and improve its conversational algorithms. If a response is flagged as unrelated or unhelpful, the model analyzes the conversation to identify where it deviated and learns to avoid similar missteps in the future. Dynamic learning allows the AI model to adapt and evolve with each interaction. The system also personalizes its responses based on user feedback. By accumulating and analyzing individual user feedback over time, the AI model tailors its responses to align more closely with each user's specific preferences and conversational styles, allowing the chatbot to become more adept at understanding and responding to the unique needs of each user.

In one embodiment, the system transfers a primary chatbot conversation to another chatbot specialized in a particular domain. The system addresses the limitations of single-domain chatbots by providing a more comprehensive and versatile conversational experience across various subject areas. The system intelligently transfers a user from one chatbot to another, depending on the nature of the inquiry and the specific expertise required. The system comprises multiple AI models, each trained in a distinct domain—customer service, technical support, sales inquiries, or product recommendations. These domain-specific chatbots are more adept at handling specialized queries within their expertise, offering more accurate and contextually relevant responses. When a user's conversation veers into a domain outside the current chatbot's expertise, the system automatically recognizes this shift. Instead of attempting to provide a sub-optimal response, the primary chatbot seamlessly transfers the conversation to the appropriate specialized chatbot. Crucially, this transfer includes passing along all relevant context and history from the conversation so the user doesn't have to repeat information, and the new chatbot can pick up the conversation fluidly. The AI model understands and maintains the overall context of the conversation, even as it spans multiple domains, ensuring continuity and coherence in the user's interaction with the system and providing a unified conversational experience despite the involvement of multiple AI models. The system includes a centralized learning mechanism, where insights and data from interactions across all domains are aggregated and analyzed, allowing each chatbot to benefit from the learnings of others, continually improving the accuracy and efficiency of the entire system.

The system uses an AI model to maintain a chatbot's conversation context in one embodiment. The system executes conversations with users through a chatbot within a chat window of a software application. This interaction occurs in real-time, where the chatbot and the user exchange content seamlessly within the chat window interface. The software application may be a mobile application with front-end components on the user's device, back-end elements on a host platform, or a progressive web application accessible via a web browser. When the user inputs a chat communication, the system receives the data within the chat window. The system leverages an advanced AI model trained to understand and analyze conversation contexts and user interactions. The model uses inputs, including the current chat communication, previous conversations, and topic data, to assess. The AI model generates a strategic chatbot response upon determining that the user's input strays from the established topic of interest. The response is formulated based on the conversation's state before receiving the off-topic communication, steering the conversation back toward the original topic of interest. The system outputs the chatbot response into the chat window, maintaining a coherent, topic-centered dialogue. The interaction is dynamic, with the AI model continually learning from the conversation flow, user responses, and outputs, potentially retraining itself to improve future interactions.

In one embodiment, a multiple-stacked generative AI model generates a single response that meets a certain quality threshold. This AI architecture involves several layers of generative models working together to enhance the generated responses' quality, relevance, and appropriateness. In a stacked architecture, multiple generative models are layered on each other. Each layer is a distinct AI model, trained on different datasets or optimized for different aspects of response generation. For example, one layer might focus on understanding the context and content of the conversation, another on ensuring grammatical correctness and language fluency, while another could be dedicated to aligning the response with specific quality parameters like accuracy or appropriateness. The response generation process in this stacked model is sequential. An input (like a user query or conversational prompt) is first processed by the initial layer, which generates a preliminary response. This response is then passed to the next layer, which refines or alters it based on its specialized function. This process continues through each stack layer until the final output is produced. At a stage in this sequential process, one or more layers are tasked with evaluating the quality of the response. This evaluation is based on predefined criteria, such as relevance to the query, coherence, adherence to ethical guidelines, factual accuracy, and user engagement potential. If a response does not meet the set quality threshold at a given layer, it may be looped back for reprocessing or modification by previous layers.

The stacked model integrates AI techniques like deep learning, natural language processing (NLP), and reinforcement learning. Each layer can utilize different functionalities and models, like transformer models for understanding context or convolutional neural networks for pattern recognition in text. The system learns from each interaction. Feedback from users or internal evaluations is used to train and refine each layer of the model continuously. This ongoing learning process helps maintain and improve the quality of responses over time. The stacked ensures the response is not only contextually and factually accurate but also engaging, empathetic, and aligned with user expectations and conversational norms.

In one example of the multiple-stacked generative AI model, a first layer in the stack is responsible for understanding the context of the user's query or input. This layer employs a deep learning model, such as a variant of a transformer model, which processes and interprets natural language. It analyzes the user's input, considering the conversation's history, the user's profile data, and other relevant contextual information. A next layer takes the contextual understanding and begins forming a response. This generative model focuses on creating content relevant to the user's query. It ensures the response is on-topic and accurately addresses the user's request or question. After generating the initial response, it passes through a quality control layer. This layer assesses the response against specific criteria like relevance to the user's query, coherence, factual accuracy, and adherence to ethical guidelines. If the response doesn't meet the required threshold in these areas, it may be sent back to previous layers for adjustments.

Another layer in the multiple-stacked generative model is the tone and style adjustment layer, which is dedicated to adjustment of the tone and style of the response. This is particularly important in maintaining a conversation that feels natural and engaging. This layer modifies the response to align with the desired tone, whether it's professional, friendly, empathetic, or any other tone suited to the context of the conversation. A personalization layer may also be utilized in the multiple-stacked generative model. This layer tailors the response to the individual user. Utilizing data from the user's profile and past interactions, the response is personalized to align with the user's preferences, past behavior, and unique characteristics. The final quality assurance layer is the final layer in the multiple-stacked generative model. This layer performs a final quality assurance check, ensuring the response meets all the desired criteria, including user engagement, appropriateness, and overall coherence.

FIG. 8A illustrates a method 800 of generating a chat response based on a tone of a conversation according to example embodiments. As an example, the method 800 may be performed by a computing system, a software application, a server, a cloud platform, a combination of systems, and the like. Referring to FIG. 8A, in 801, the method may include executing an interaction with an account via a chatbot within a chat element running on an account device.

In 802, the method may include determining a next response for the chatbot to output within the chat element based on an execution of an artificial intelligence (AI) model on content within the chat element. In 803, the method may include determining an interaction attribute of the next response based on an execution of a second AI model on the content from the chat element and on historical chat content of the account device and the chatbot. In 804, the method may include outputting the next response via the chatbot within the chat element based on the determined interaction attribute.

In some embodiments, the interaction attribute may include one or more of a humorous tone, a serious tone, an assertive tone, an optimistic tone, an informative tone, a formal tone, and an aggressive tone. In some embodiments, the method may further comprise at least one of modify a word within the next response and add a new word to the next response based on the interaction attribute, prior to the next response being output within the chat element. In some embodiments, the method further comprises extracting text content from previous chat interactions between the account and the chatbot and training the AI model based on the extracted text content from the previous chat interactions. In some embodiments, the method further comprises determining to speed up a pace of the interaction based on the interaction attribute, and in response, adding additional content to the next response prior to the next response being output within the chat element.

In some embodiments, the method further comprises determining to slow down a pace of the interaction based on the interaction attribute, and in response, removing content from the next response prior to the next response being output within the chat element. In some embodiments, the outputting comprises adding humorous text to the next response based on the interaction attribute, wherein the humorous text comprises one or more humorous words selected from a predefined list of humorous words. In some embodiments, the determining of the interaction attribute comprises determining to use a previous interaction element of the account from a previous chat interaction between the account and the chatbot based on the execution of the second AI model. In some embodiments, the interaction attribute is a tone.

FIG. 8B illustrates a method 810 of detecting and overcoming an insufficient or unrelated chatbot response according to example embodiments. As an example, the method 810 may be performed by a computing system, a software application, a server, a cloud platform, a combination of systems, and the like. Referring to FIG. 8B, in 811, the method may include executing an interaction event with an account device and a chatbot within a chat element based on chatbot responses determined by an artificial intelligence (AI) model, wherein the interaction event comprises an exchange of content between the account device and the chatbot through the chat element.

In 812, the method may include determining that a related response to the content has not been output by the chatbot within the chat element. In response, in 813, the method may include executing a second AI model on the content received from the account device within the chat element to generate a new chatbot response to the content. In 814, the method may include outputting the new chatbot response within the chat element.

In some embodiments, the generating comprises generating the chatbot response with the content which attempts to guide the interaction back to the first topic of interest based on the execution of the artificial intelligence model. In some embodiments, the method further comprises determining the second topic of interest based on the execution of the artificial intelligence model on a first portion of the content exchanged between the account device and the chatbot at a start of the interaction within the chat element and storing the second topic of interest within a memory device. In some embodiments, the determining comprises determining a topic of the interaction based on the execution of the artificial intelligence model and comparing the topic of the interaction to the second topic of interest to determine that the interaction is unrelated to the second topic of interest.

In some embodiments, the state of the interaction prior to receipt of the interaction includes previous interaction input by the account device prior to the interaction from the account device. In some embodiments, method further comprises training the artificial intelligence model based on the execution of the artificial intelligence model on previous chat interactions between the chatbot and a plurality of other account devices and topics of interest assigned to the previous chat interactions. In some embodiments, the method further comprises adding an identifier of the second topic of interest within the interaction after the interaction has ended, storing the interaction with the identifier within a memory, and re-training the artificial intelligence model based on the execution of the artificial intelligence model on the interaction and the identifier of the second topic of interest.

FIG. 8C illustrates a method 820 of guiding a chat conversation to a topic of interest according to example embodiments. As an example, the method 820 may be performed by a computing system, a software application, a server, a cloud platform, a combination of systems, and the like. Referring to FIG. 8C, in 821, the method may include executing an interaction with an account device about a first topic of interest and a chatbot within a chat element, wherein the interaction comprises an exchange of content between the account device and the chatbot within the chat element.

In 822, the method may include receiving an interaction data from the account device within the chat element. In 823, the method may include determining that the interaction data is a second topic of interest based on an execution of an artificial intelligence model on the interaction and the first topic of interest. In 824, the method may include generating a chatbot response to the interaction data based on the execution of the artificial intelligence model on a state of the interaction prior to receipt of the interaction data. In 825, the method may include outputting the chatbot response within the chat element.

In some embodiments, the generating may include generating the chatbot response with the content that attempts to guide the conversation back to the topic of interest based on the execution of the AI model. In some embodiments, the method may further include determining the topic of interest based on the execution of the AI model on a first portion of the content exchanged between the user and the chatbot at a start of the conversation within the chat window and storing the topic of interest within a memory device. In some embodiments, the determining may include determining a topic of the chat communication based on the execution of the AI model and comparing the topic of the chat communication to the topic of interest to determine that the chat communication is unrelated to the topic of interest.

In some embodiments, the state of the conversation before receipt of the chat communication may include previous chat communications input by the user before the chat communication from the user. In some embodiments, the method may further include training the AI model based on the execution of the AI model on previous chat conversations between the chatbot and a plurality of other users of the software application and topics of interest assigned to the previous chat conversations. In some embodiments, the method may further include adding an identifier of the topic of interest within the conversation after the conversation has ended, storing the conversation with the identifier within a memory, and re-training the AI model based on the execution of the AI model on the conversation and the identifier of the topic of interest.

FIG. 8D illustrates a method 830 of an example flow diagram. As an example, the method 830 may be performed by a computing system, a software application, a server, a cloud platform, a combination of systems, and the like. Referring to FIG. 8D, in 831, the method may include the interaction attribute comprises one or more of a humorous tone, a serious tone, an assertive tone, an optimistic tone, an informative tone, a formal tone, and an aggressive tone. In 832, the method may include modifying a word within the next response and adding a new word to the next response based on the interaction attribute, prior to the next response being output within the chat element. In 833, the method may include extracting text content from previous chat interactions between the account and the chatbot and training the AI model based on the extracted text content from the previous chat interactions. In 834, the method may include determining to speed up a pace of the interaction based on the interaction attribute, and in response, adding additional content to the next response prior to the next response being output within the chat element. In 835, the method may include determining to slow down a pace of the interaction based on the interaction attribute, and in response, removing the content from the next response prior to the next response being output within the chat element. In 836, the method may include adding humorous text to the next response based on the interaction attribute, wherein the humorous text comprises one or more humorous words selected from a predefined list of humorous words. In 837, the method may include determining to use a previous interaction element of the account from a previous chat interaction between the account and the chatbot based on the execution of the second AI model. In 838, the method may include the interaction attribute is a tone.

FIG. 8E illustrates a method 840 of an example flow diagram. As an example, the method 840 may be performed by a computing system, a software application, a server, a cloud platform, a combination of systems, and the like. Referring to FIG. 8E, in 841, the method may include determining that the related response to the content has not been output by the chatbot within the chat element based on the response from the account device within the chat element. In 842, the method may include determining that the related response to the content has not been output by the chatbot within the chat element based on a lack of the response from the account device within a predetermined period of time. In 843, the method may include extracting the exchange of the content from the chat element and determining that the related response to the content has not been output by the chatbot within the chat element based on an execution of the AI model on the exchange of the content.

In 844, the method may include executing the second AI model on interaction event content previously input to the AI model to generate the new chatbot response. In 845, the method may include determining that the related response to the content has not been output by the second AI model based on the content within the chat element, and in response, executing a third AI model on the content received from the account device within the chat element to generate another new chatbot response to the content and output the another new chatbot response within the chat element. In 846, the method may include the AI model comprises a different algorithm than the second AI model, and the method further comprises training the AI model and the second AI model on same training data. In 847, the method may include the AI model comprises a same algorithm as the second AI model, and the method further comprises training the AI model and the second AI model on different training data.

FIG. 8F illustrates a method 850 of an example flow diagram. As an example, the method 850 may be performed by a computing system, a software application, a server, a cloud platform, a combination of systems, and the like. Referring to FIG. 8F, in 851, the method may include generating the chatbot response with the content which attempts to guide the interaction back to the first topic of interest based on the execution of the artificial intelligence model. In 852, the method may include determining the second topic of interest based on the execution of the artificial intelligence model on a first portion of the content exchanged between the account device and the chatbot at a start of the interaction within the chat element and storing the second topic of interest within a memory device. In 853, the method may include determining a topic of the interaction based on the execution of the artificial intelligence model and comparing the topic of the interaction to the second topic of interest to determine that the interaction is unrelated to the second topic of interest In 854, the method may include the state of the interaction prior to receipt of the interaction includes previous interaction input by the account device prior to the interaction from the account device. In 855, the method may include training the artificial intelligence model based on the execution of the artificial intelligence model on previous chat interactions between the chatbot and a plurality of other account devices and topics of interest assigned to the previous chat interactions. In 856, the method may include adding an identifier of the second topic of interest within the interaction after the interaction has ended, storing the interaction with the identifier within a memory, and re-training the artificial intelligence model based on the execution of the artificial intelligence model on the interaction and the identifier of the second topic of interest.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 9 illustrates an example computer system architecture, which may represent or be integrated in any of the above-described components, etc.

Figure 9:
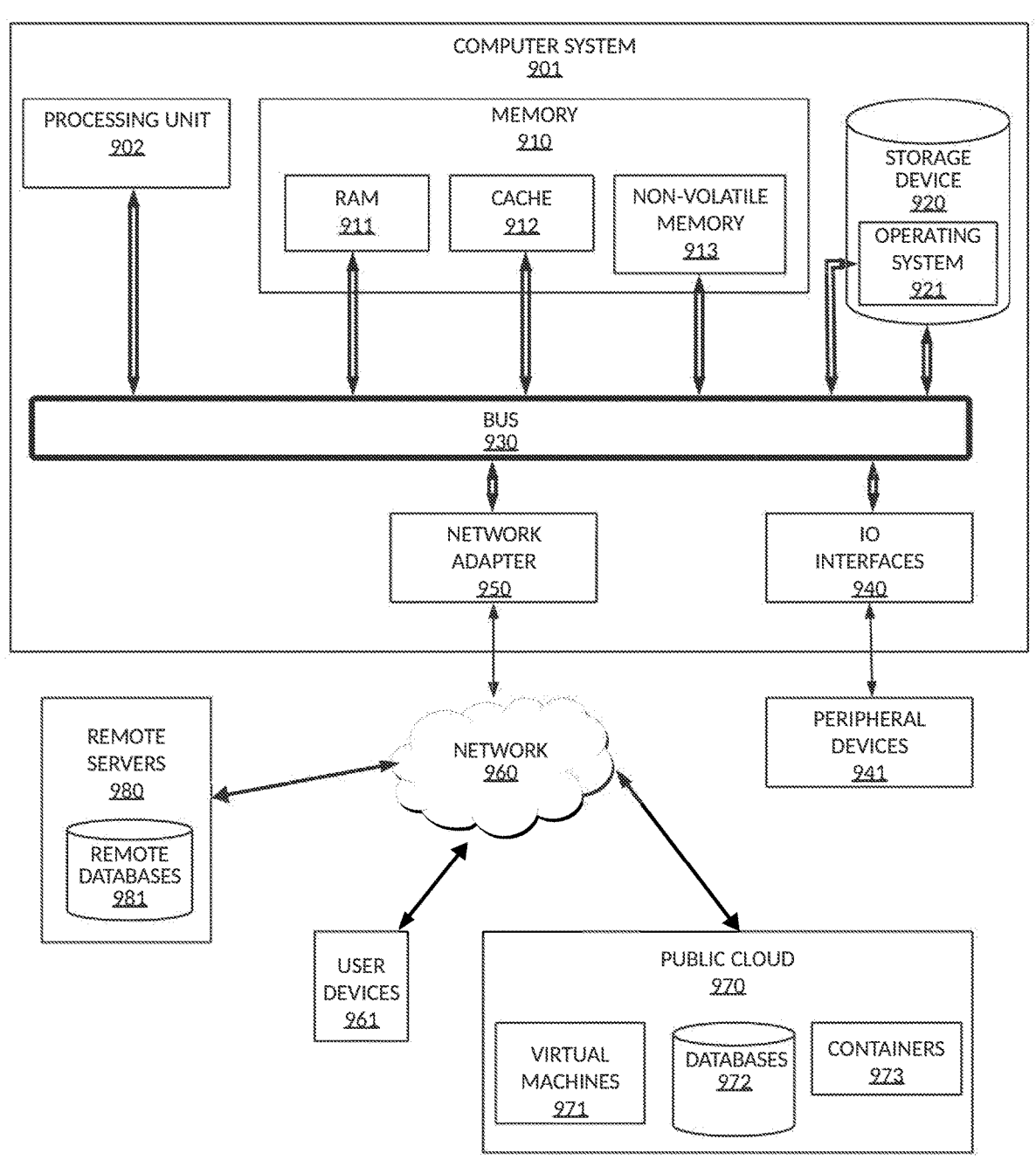
FIG. 9 is a diagram illustrating a computing system that may be used in any of the example embodiments described herein.

FIG. 9 illustrates a computing environment according to example embodiments. FIG. 9 is not intended to suggest any limitation as to the scope of use or functionality of embodiments of the application described herein. Regardless, the computing environment 900 can be implemented to perform any of the functionalities described herein. In computer environment 900, there is a computer system 901, operational within numerous other general-purpose or special-purpose computing system environments or configurations.

Computer system 901 may take the form of a desktop computer, laptop computer, tablet computer, smartphone, smartwatch or other wearable computer, server computer system, thin client, thick client, network PC, mini computer system, mainframe computer, quantum computer, and distributed cloud computing environment that include any of the described systems or devices, and the like or any other form of computer or mobile device now known or to be developed in the future that is capable of running a program, accessing a network 960 or querying a database. Depending upon the technology, the performance of a computer-implemented method may be distributed among multiple computers and among multiple locations. However, in this presentation of the computing environment 900, a detailed discussion is focused on a single computer, specifically computer system 901, to keep the presentation as simple as possible.

Computer system 901 may be located in a cloud, even though it is not shown in a cloud in FIG. 9. On the other hand, computer system 901 is not required to be in a cloud except to any extent as may be affirmatively indicated. Computer system 901 may be described in the general context of computer system-executable instructions, such as program modules, executed by a computer system 901. Generally, program modules may include routines, programs, objects, components, logic, data structures, and so on that perform tasks or implement certain abstract data types. As shown in FIG. 9, computer system 901 in computing environment 900 is shown in the form of a general-purpose computing device. The components of computer system 901 may include, but are not limited to, one or more processors or processing units 902, a system memory 910, and a bus 930 that couples various system components, including system memory 910 to processor 902.

Processing unit 902 includes one or more computer processors of any type now known or to be developed. The processing unit 902 may contain circuitry distributed over multiple integrated circuit chips. The processing unit 902 may also implement multiple processor threads and multiple processor cores. Cache 912 is a memory that may be in the processor chip package(s) or may be located "off-chip," as depicted in FIG. 9. Cache 912 is typically used for data or code that should be available for rapid access by the threads or cores running on the processing unit 902. In some computing environments, processing unit 902 may be designed to work with qubits and perform quantum computing.

Memory 910 is any type of volatile memory now known or to be developed in the future. Examples include dynamic type random access memory (RAM) 911 or static type RAM 911. Typically, the volatile memory is characterized by random access, but this is not required unless affirmatively indicated. In computer system 901, memory 910 is located in a single package and is internal to computer system 901, but alternatively or additionally, the volatile memory may be distributed over multiple packages and/or located externally with respect to computer system 901. By way of example only, memory 910 can be provided for reading from and writing to a non-removable, non-volatile magnetic media (shown as storage device 920, and typically called a "hard drive"). Memory 910 may include at least one program product having a set (e.g., at least one) of program modules that are configured to carry out the functions of various embodiments of the application. A typical computer system 901 may include cache 912, a type of specialized volatile memory generally faster than RAM 911 and generally located closer to the processing unit 902. Cache 912 stores frequently accessed data and instructions accessed by the processing unit 902 to speed up processing time. The computer system 901 may also include non-volatile memory 913 in the form of ROM, PROM, EEPROM, and flash memory. Non-volatile memory 913 often contains programming instructions for starting the computer, including the basic input/output system (BIOS) and information required to start the operating system 921.

Computer system 901 may include a removable/non-removable, volatile/non-volatile computer storage device 920. By way of example only, storage device 920 can be a non-removable, non-volatile magnetic media (not shown and typically called a "hard drive"). It can be connected to the bus 930 by one or more data interfaces. In embodiments where computer system 901 is required to have a large amount of storage (for example, where computer system 901 locally stores and manages a large database), then this storage may be provided by peripheral storage devices 920 designed for storing very large amounts of data, such as a storage area network (SAN) that is shared by multiple, geographically distributed computers.

The operating system 921 is software that manages computer system 901 hardware resources and provides common services for computer programs. Operating system 921 may take several forms, such as various known proprietary operating systems or open-source Portable Operating System Interface type operating systems that employ a kernel.

The bus 930 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. The bus 930 is the signal conduction path that allows the various components of computer system 901 to communicate with each other.

Computer system 901 may also communicate with one or more peripheral devices 941 via an input/output (I/O) interface 940. Such devices may include a keyboard, a pointing device, a display, etc.; one or more devices that enable a user to interact with computer system 901; and/or any devices (e.g., network card, modem, etc.) that enable computer system 901 to communicate with one or more other computing devices. Such communication can occur via I/O interfaces 940. As depicted, IO interface 940 communicates with the other components of computer system 901 via bus 930.

Network adapter 950 enables the computer system 901 to connect and communicate with one or more networks 960, such as a local area network (LAN), a wide area network (WAN), and/or a public network (e.g., the Internet). It bridges the computer's internal bus 930 and the external network, allowing data to be exchanged efficiently and reliably. Network adapter 950 may include hardware, such as modems or Wi-Fi signal transceivers, software for packetizing and/or de-packetizing data for communication network transmission. Network adapter 950 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Network 960 is any computer network that can receive and/or transmit data. Network 960 can include a WAN, LAN, private cloud, or public Internet, capable of communicating computer data over non-local distances by any technology for communicating computer data now known or to be developed in the future. Any connection depicted can be wired and/or wireless and may traverse other components that are not shown. In some embodiments, a network 960 may be replaced and/or supplemented by LANs designed to communicate data between devices located in a local area, such as a Wi-Fi network. The network 960 typically includes computer hardware such as copper transmission cables, optical transmission fibers, wireless transmission, routers, firewalls, switches, gateway computers, edge servers, and network infrastructure known now or to be developed in the future. Computer system 901 connects to network 960 via network adapter 950 and bus 930.

User devices 961 are any computer systems used and controlled by an end user in connection with computer system 901. For example, in a hypothetical case where computer system 901 is designed to provide a recommendation to an end user, this recommendation would typically be communicated from network adapter 950 of computer system 901 through network 960 to a user device 961, allowing user device 961 to display, or otherwise present, the recommendation to an end user. User devices can be a wide array of devices, including personal computers (PCs), laptop computers, tablet computers, hand-held computers, mobile phones, etc.

A public cloud 970 is on-demand availability of computer system resources, including data storage, and computing power, without direct active management by the user. Public clouds 970 are often distributed, with data centers in multiple locations for availability and performance. Computing resources on public clouds 970 are shared across multiple tenants through virtual computing environments comprising virtual machines 971, databases 972, containers 973, and other resources. A container 973 is an isolated, lightweight software for running an application on the host operating system 921. Containers 973 are built on top of the host operating system's kernel and contain only applications and some lightweight operating system APIs and services. In contrast, virtual machines 971 are a software layer which include a complete operating system 921 and kernel. Virtual machines 971 are built on top of a hypervisor emulation layer designed to abstract a host computer's hardware from the operating software environment. Public clouds 970 generally offer hosted databases 972 abstracting high-level database management activities.

Remote servers 980 are any computers that serve at least some data and/or functionality over a network 960, for example, WAN, a virtual private network (VPN), a private cloud, or via the Internet to computer system 901. These networks 960 may communicate with a LAN to reach users. The user interface may include a web browser or an application that facilitates communication between the user and remote data. Such applications have been referred to as "thin" desktop applications or "thin clients." Thin clients typically incorporate software programs to emulate desktop sessions. Mobile applications can also be used. Remote servers 980 can also host remote databases 981, with the database located on one remote server 980 or distributed across multiple remote servers 980. Remote databases 981 are accessible from database client applications installed locally on the remote server 980, other remote servers 980, user devices 961, or computer system 901 across a network 960.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
a memory; and
a processor coupled to the memory, the processor configured to:
execute an interaction with an account via a chatbot within a chat element running on an account device,
determine a next response for the chatbot to output within the chat element based on an execution of an artificial intelligence (AI) model on content within the chat element,
determine an interaction attribute of the next response based on an execution of a second AI model on the content from the chat element and on historical chat content of the account device and the chatbot, and
output the next response via the chatbot within the chat element based on the determined interaction attribute,
wherein a slow down of a pace of the interaction is determined based on the interaction attribute, and in response, the content from the next response is removed prior to the next response being output within the chat element.

2. The apparatus of claim 1, wherein the interaction attribute comprises one or more of a humorous tone, a serious tone, an assertive tone, an optimistic tone, an informative tone, a formal tone, and an aggressive tone.

3. The apparatus of claim 1, wherein the processor is further configured to at least one of modify a word within the next response and add a new word to the next response based on the interaction attribute, prior to the next response being output within the chat element, wherein an AI agent performs an action based on the next response.

4. The apparatus of claim 1, wherein the processor is further configured to extract text content from previous chat interactions between the account and the chatbot and train the AI model based on the extracted text content from the previous chat interactions.

5. The apparatus of claim 1, wherein the processor is further configured to determine to speed up a pace of the interaction based on the interaction attribute, and in response, add additional content to the next response prior to the next response being output within the chat element.

6. The apparatus of claim 1, wherein the processor is configured to determine to add humorous text to the next response based on the interaction attribute, wherein the humorous text comprises one or more humorous words selected from a predefined list of humorous words.

7. The apparatus of claim 1, wherein the processor is configured to determine to use a previous interaction element of the account from a previous chat interaction between the account and the chatbot based on the execution of the second AI model.

8. The apparatus of claim 1, wherein the interaction attribute is a tone.

9. A method comprising:
executing an interaction with an account via a chatbot within a chat element running on an account device;
determining a next response for the chatbot to output within the chat element based on an execution of an artificial intelligence (AI) model on content within the chat element;
determining an interaction attribute of the next response based on an execution of a second AI model on the content from the chat element and on historical chat content of the account device and the chatbot; and
outputting the next response via the chatbot within the chat element based on the determined interaction attribute,
wherein a slow down of a pace of the interaction is determined based on the interaction attribute, and in response, the content from the next response is removed prior to the next response being output within the chat element.

10. The method of claim 9, wherein the interaction attribute comprises one or more of a humorous tone, a serious tone, an assertive tone, an optimistic tone, an informative tone, a formal tone, and an aggressive tone.

11. The method of claim 9, wherein the method further comprises at least one of modifying a word within the next response and adding a new word to the next response based on the interaction attribute, prior to the next response being output within the chat element, wherein an AI agent performs an action based on the next response.

12. The method of claim 9, wherein the method further comprises extracting text content from previous chat interactions between the account and the chatbot and training the AI model based on the extracted text content from the previous chat interactions.

13. The method of claim 9, wherein the method further comprises determining to speed up a pace of the interaction based on the interaction attribute, and in response, adding additional content to the next response prior to the next response being output within the chat element.

14. The method of claim 9, wherein the outputting comprises adding humorous text to the next response based on the interaction attribute, wherein the humorous text comprises one or more humorous words selected from a predefined list of humorous words.

15. The method of claim 9, wherein the determining the interaction attribute comprises determining to use a previous interaction element of the account from a previous chat interaction between the account and the chatbot based on the execution of the second AI model.

16. The method of claim 9, wherein the interaction attribute is a tone.

17. A non-transitory computer-readable storage medium comprising instructions stored therein which when executed by a processor cause the processor to perform:
executing an interaction conversation with an account via a chatbot within a chat element running on an account device;
determining a next response for the chatbot to output within the chat element based on an execution of an artificial intelligence (AI) model on content within the chat element;
determining an interaction attribute of the next response based on an execution of a second AI model on the content from the chat element and on historical chat content of the account device and the chatbot; and
outputting the next response via the chatbot within the chat element based on the determined interaction attribute,
wherein a slow down of a pace of the interaction is determined based on the interaction attribute, and in response, the content from the next response is removed prior to the next response being output within the chat element.

18. The non-transitory computer-readable storage medium of claim 17, wherein the interaction attribute comprises one or more of a humorous tone, a serious tone, an assertive tone, an optimistic tone, an informative tone, a formal tone, and an aggressive tone.

\* \* \* \* \*